United States Patent [19]

Szczepanek et al.

[11] Patent Number: 4,674,086
[45] Date of Patent: Jun. 16, 1987

[54] TOKEN RING ACCESS CONTROL PROTOCOL CIRCUIT

[75] Inventors: Andre Szczepanek, Brickhill; Stephen Hubbins, Kentston, both of England

[73] Assignee: Texas Instruments Incorporated, Dallas, Tex.

[21] Appl. No.: 809,626

[22] Filed: Dec. 16, 1985

[51] Int. Cl.⁴ .............................................. H04J 3/16
[52] U.S. Cl. ......................................... 370/86; 370/89
[58] Field of Search .......................... 370/86, 89, 90; 340/825.05

[56] References Cited

U.S. PATENT DOCUMENTS

| | | | |
|---|---|---|---|
| 4,491,946 | 1/1985 | Kryskow, Jr. et al. | 370/89 |
| 4,507,777 | 3/1985 | Tucker et al. | 370/86 |
| 4,604,742 | 8/1986 | Hamada et al. | 370/89 |

Primary Examiner—Douglas W. Olms
Assistant Examiner—Kenneth I. Rokoff

[57] ABSTRACT

A token ring access control protocol circuit which includes an M/T converter for converting incoming serial data in differential Manchester encoded form into transitional encoded form. Next the data is fed into a shift register and held temporarily while it is compared with preset sequences to determine if it is a starting delimiter or an ending delimiter. If a starting delimiter pulse is generated and used to synchronize subsequent circuitry if required. Data from the shift register is continuously sampled with at least a 2 baud delay by a data sample latch circuit which provides and output line for data values and another output line for code violation signals. The data values and code violation values go to a data receiving circuit which processes the data, and loads it onto a local data bus for transmission to other parts of a token ring control system. A data insertion multiplexer has inputs which are connected to the serial data output of the shift register, the output of the transmit machine and to various state machines for inserting modified data into the serial data path. The output of the data insertion multiplexer goes both to a transmit output multiplexer and to a fairness delay.

13 Claims, 21 Drawing Figures

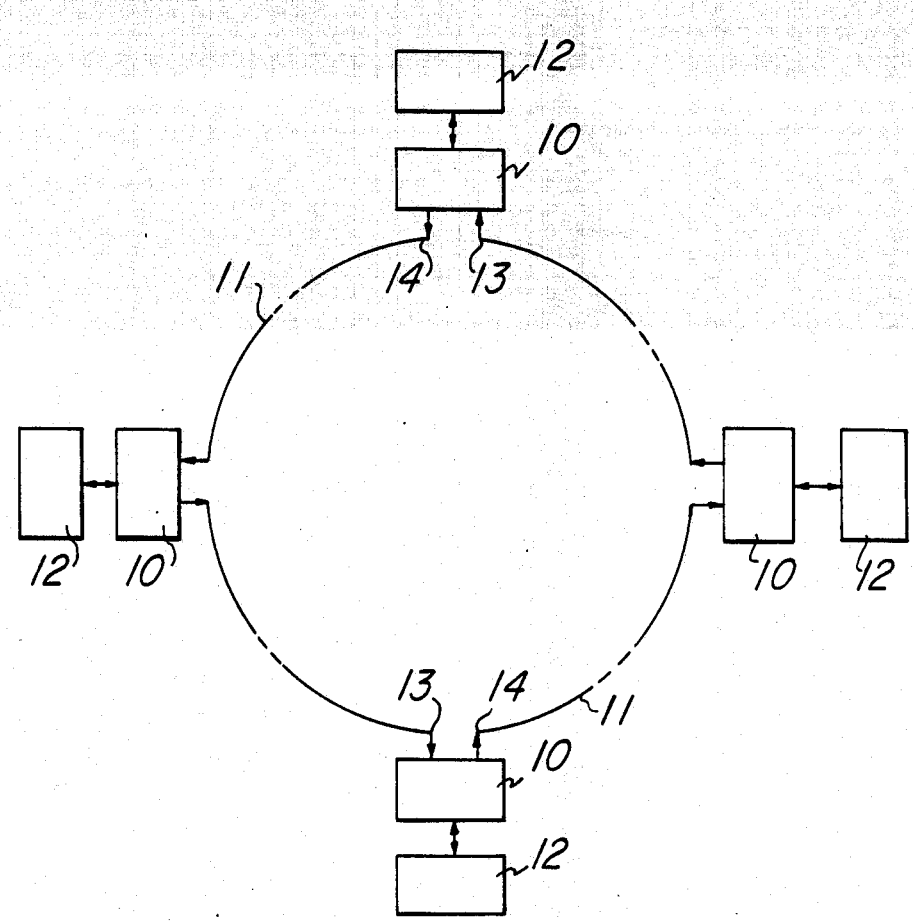
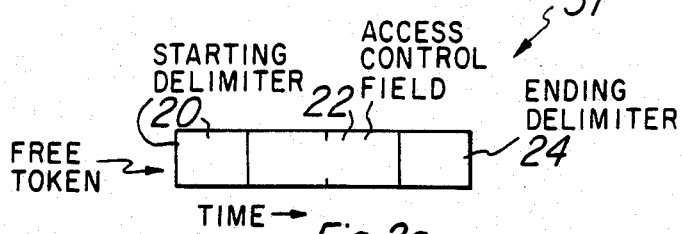
Fig. 2a
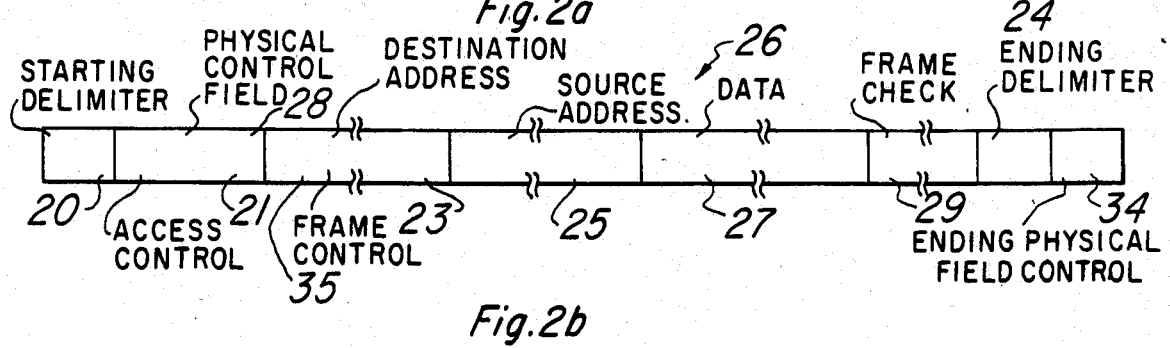
Fig. 2b

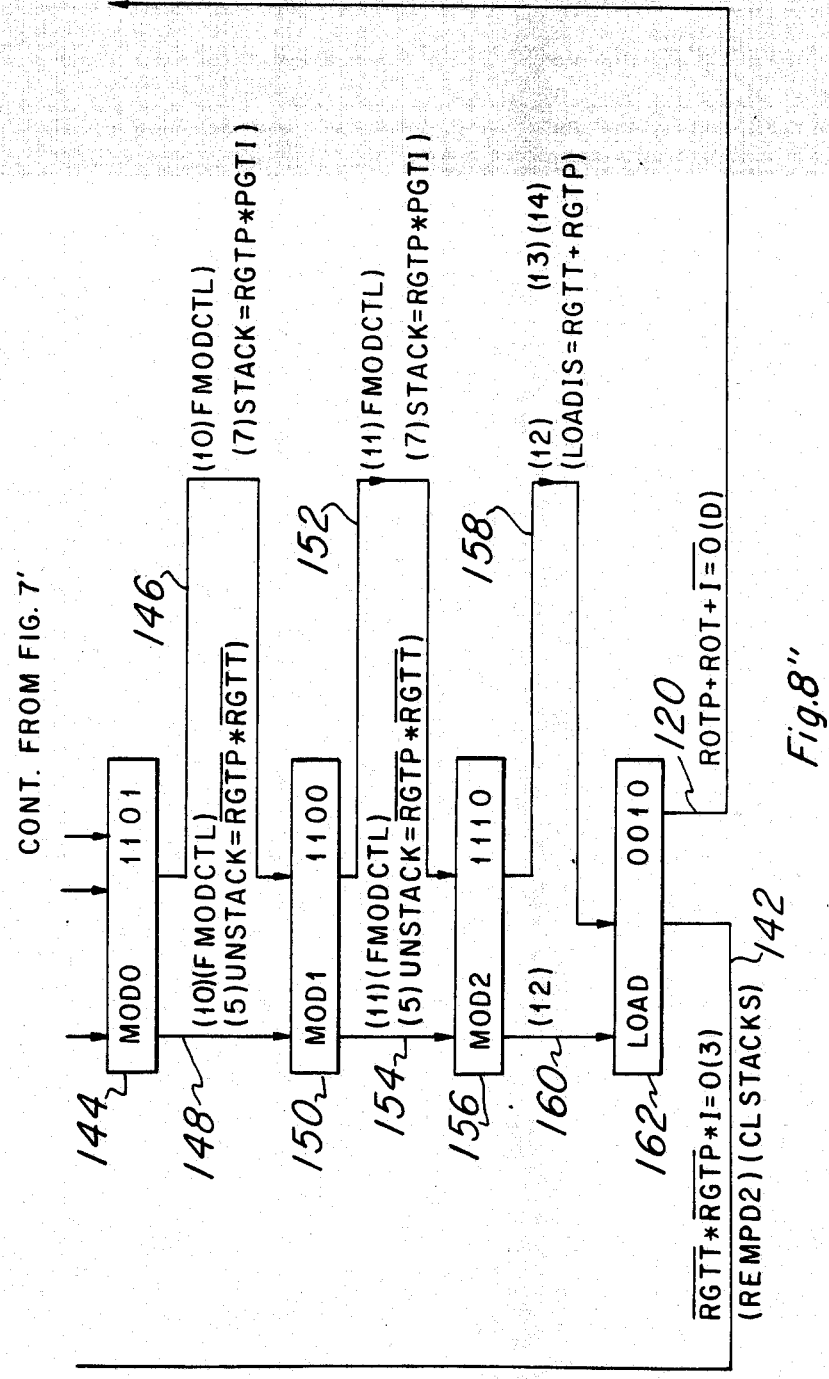
Fig.8"

TOKEN RING ACCESS CONTROL PROTOCOL CIRCUIT

BACKGROUND OF THE INVENTION

The present invention relates to digital systems of the type used in loop communications systems and more particularly to a protocol circuit for a local area network (LAN) of the token ring type.

A token ring local area network (LAN) is a data communications system which transfers data among a number of stations coupled to a one-way signal path. Each station has a host processor with memory and various periperal devices to function as an independent workstation. Access to the ring is controlled by token passing wherein a free or busy token is passed from one station to the next around the ring. An early example of the token ring is shown in U.S. Pat. No. 3,597,549 issued to Farmer & Newhall on Aug. 3, 1971 and assigned to Bell Telephone Laboratories. The Farmer & Newhall network discloses use of a supervisory station for resolving technical and administrative problems of communication on that loop such as to break in on the transmission of a station which is dominating the loop and to issue a signal that results in all stations losing loop control. Although Farmer & Newhall allows a mode in which control is passed from station to station within a loop without intervention by the supervisory station this occurs only as long as there are no more messages to be transmitted or until trouble develops in the loop. Otherwise, the loop is under control of the supervisory station.

In a further refinement IBM developed the so-called Munich ring which was reported at Proceedings of the National Telecommunications Conference, Nov. 1981, pp. A.2.2.1–A.2.2.6. Standard protocols for these communications methods have been published by the IEEE as the 802.5 token ring proposal, and a similar report by the European Computer Manufacturers organization.

The present invention when used in a local area network system is concerned with the protocol handler for a token ring local area type of network system. There are several possible ways to design a protocol handler circuit. Regardless of the particulars of the design, however, all must carry out four major functions. First, passing frames must be examined, their status recorded and, if necessary, marked or deleted by a monitor. Second the protocol handling circuit must recognize frames and copy those with appropriate addresses, signal the return of transmitted frames to a transmit state machine and signal successful copy and/or address recognition by setting flag bits at the end of the frame. Third the circuit must be able to transmit frames in various modes and for the token transmission mode it must be capable of examining and recognizing incoming tokens to determine whether or not to use them. It must be able to release a token upon return of its frame or on request. Fourth, a proper priority token protocol must be activated by the release of a token from the transmit machine and then remain active as long as necessary as determined by a priority token algorithm. While active it must examine passing tokens and modify them as necessary according to a priority token algorithm. As this involves copying a field from the end to the start of a byte sufficient delay must be allowed in the data path for this translation to be accomplished. It is possible to carry out each of the foregoing functions independently in sequence. However, such an approach would result in cascading of the multiplexers, multiple delimiter decoding to detect the start and end of a token for frame and multiple data modification points. The foregoing would necessarily result in increased complexity, delay and power consumption.

Accordingly, it is a principal object of the invention to provide a protocol handler design that is as simple as possible but yet capable of carrying out the functions mentioned above. It is a further object of the present invention to provide a protocol handler circuit design that introduces a minimum of delay in the ring.

SUMMARY OF THE INVENTION

According to the present invention there is provided a token ring access control protocol circuit which includes an M/T converter for converting incoming serial data to a selected encoded form into transitional encoded form. Next the data is fed into a shift register and held temporarily while it is compared with preset sequences to determine if it is a starting delimiter or an ending delimiter. If a starting delimiter pulse is generated and used to sychronize subsequent circuitry if required. Data from the shift register is continuously sampled with at least a 2 baud delay by a data sample latch circuit which provides and output line for data values and another output line for code violation signals. The data values and code violation values go to a data receiving circuit which processes the data, and loads it onto a local data bus for transmission to other parts of a token ring control system. A data insertion multiplexer has inputs which are connected to the serial data output of the shift register, the output of the transmit machine and to various state machines for inserting modified data into the serial data path. The output of the data insertion multiplexer goes both to a transmit output multiplexer and to a fairness delay.

The fairness delay delays the data at least 9 bits to allow the priority state machine to modify the priority indicator of the transmitted token, if a change is needed. The output of the fairness delay goes both to the transmit output multiplexer and to a monitor delay. The monitor delay inserts a predetermined delay into the signal path before entering an elastic buffer where phase jitter of the signal is compensated for. A second monitor delay is inserted before entering a third input of the transmit output multiplexer. Finally, the output from the second monitor delay into a T/M converter which converts the signal from transitional to Manchester encoding again.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 is a schematic diagram of a token ring local area network in which host processors are interfaced to the ring with an adaptor;

FIG. 2a is a schematic diagram of a free token for transmission of the ring;

FIG. 2b is a schematic diagram of a frame;

DETAILED DESCRIPTION WITH REFERENCE TO THE DRAWINGS

Figure 3:
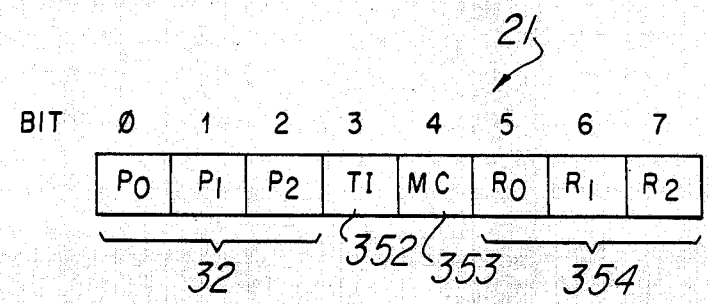
FIG. 3 is a schematic diagram of the access field of a token or frame.

Referring to FIG. 1 there is shown a schematic diagram of the mechanism for controlling the flow of data in a token-ring adaptor 10 in series with the ring unidirectional transmission lines 11. Each line 11 has a receiving end 14 and a transmitting end 13 which couple to each adaptor 10. The adaptor 10 acts as a network interface to a host computer 12 or to a perpheral device (not shown) under the control of a host computer. It handles the basic transmission functions including frame recognition, token generation, address decoding, error checking, buffering of frames and link fault detection.

In the system of FIG. 1 the sending node 10 can determine on its own when it may begin transmitting based on the status of the line at the time. The control scheme involves transmission of data from one node to another by using a particular frame format. The binary data originating within a node 10 must be encoded for effective transmission.

Referring to FIG. 2(a) there is shown the frame format corresponding to a "free token" which is passed sequentially from node-to-node around the ring giving each an opportunity to transmit data when it receives the "free token". The frame format of a free token 31 is shown in FIG. 2a as including a starting delimiter 20 that identifies the start of a frame, an access control field 21 which provides for different priority levels of access to the ring 11 and an ending delimiter 24 to identify the end of the frame. A node having data to transmit can modify the "free token" frame 31 by adding additional information to it. A node that initiates a frame transfer must remove that frame from the ring on its return a free token upon receipt of the physical header (i.e. on receipt of its own source address).

The frame format for a data containing frame 26 is seen in FIG. 2b. Frame 26 also has a physical starting delimiter 20 and ending delimiter 24, a physical control field 28, a destination address 32 and a source address 34. The physical control field 28 has a first byte 21 being the access control and a second byte 35 containing further ring management information. The frame 26 also contains data 27, a frame check sequence 29 and an ending physical control field 34 which is used for certain physical control functions. The frame check sequence 29 is a 32 bit redundancy check used to detect errors within a second byte of the physical control field, the address fields or the data field itself.

Figure 4:
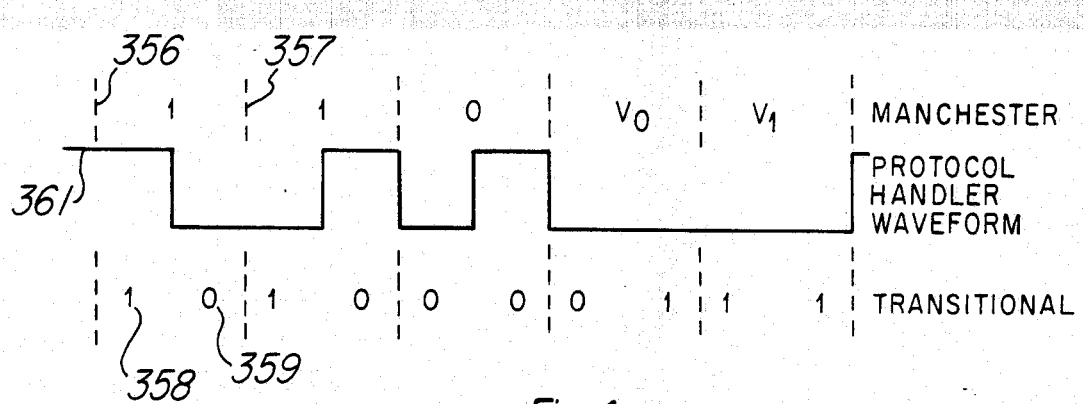
FIG. 4 is a diagram of a portion of a waveform in Manchester encoded form showing its relation to Transitional form.

The access control field 21 shown in more detail in FIG. 3 of a token/frame has a total of 8 bit positions. The first three positions carry the three bits of the priority indicator 32. The fourth bit is the token indicator 352 which is set to "1" for a "busy" token and to "0" for a free token. The fifth bit is the monitor count 353 which is set to "1" by a station which acts as an Active Monitor when the token priority indicator is set or the token is greater than zero. If the frame or token comes back to the Active Monitor station with the Monitor count bit still at "1" that token/frame is not repeated back onto the ring. Instead the ring is purged and an error counter in the Active Monitor is incremented. The last 3 bits of the access control field 21 contain the priority reservation bits 354. Referring to FIG. 4 there is shown a portion of a data waveform 361 in Manchester encoded form. The bit boundaries 356, 357 etc. are shown by dotted vertical lines. In Manchester code valid data bits must have a transition halfway between bit boundaries. In FIG. 4 the first 3 bits shown are valid. A binary "1" encoded by forming no transition at the start of an associated bit boundary while a binary "0" does have such a transition. The last two bits shown are code violations since they do not have transitions midway between their bit boundaries. In transitional form a "1" is formed if there is no transition at the associated half bit boundary while a "0" is formed if there is. Thus, the second baud of a bit designates only code violations while the first baud of a bit designates the data value.

Figure 5:
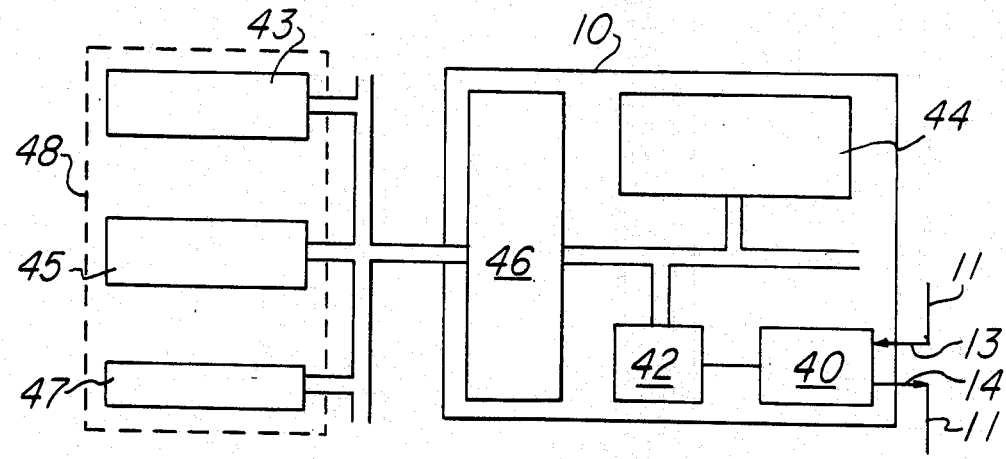
FIG. 5 is a schematic diagram of the parts of an adaptor together with its coupling to a host processor.

The circuit structure employed in the adapter 10 shown in FIG. 5 consists of a ring interface system 40, a protocol handler 42, a message processor 44, a system interface 46 coupled to a host processor system 48. The ring interface system 40 includes line drivers and receivers, a circuit for employing phase lock loop on incoming data to extract the baud frequency of the data stream and fault detection such as signal loss, wire fault and frequency error (not shown). Ordinarily, the foregoing blocks are formed on semiconductor chips preferably in MOS form.

The protocol handler 42 is a system for executing various protocol functions such as address recognition, serial to parallel and parallel to serial conversion, encoding to and from differential Manchester code, token control buffer management, compensation for phase jitter and priority control of frames. The protocol handle 42 receives frames and clock signal from and transmits frames to the ring interface 40.

The message processor 44 has a 16 bit central processing unit with 2.75 kilobytes of parity protected random access memory for frame buffering and working storage, a process timer for the ring protocol programs, and includes code stored in read only memory in the protocol handler 42.

The system interface 46 interfaces the message processor 44 and the protocol handler 42 with the attaching product which, in this case, is shown as the host processing system 48. Through the system interface 46 the adapter 10 passes frame data, operational parameters, and extensive diagnostics and error codes which provide the host processing system with detailed information on the operation of the adapter 10.

Figure 6:
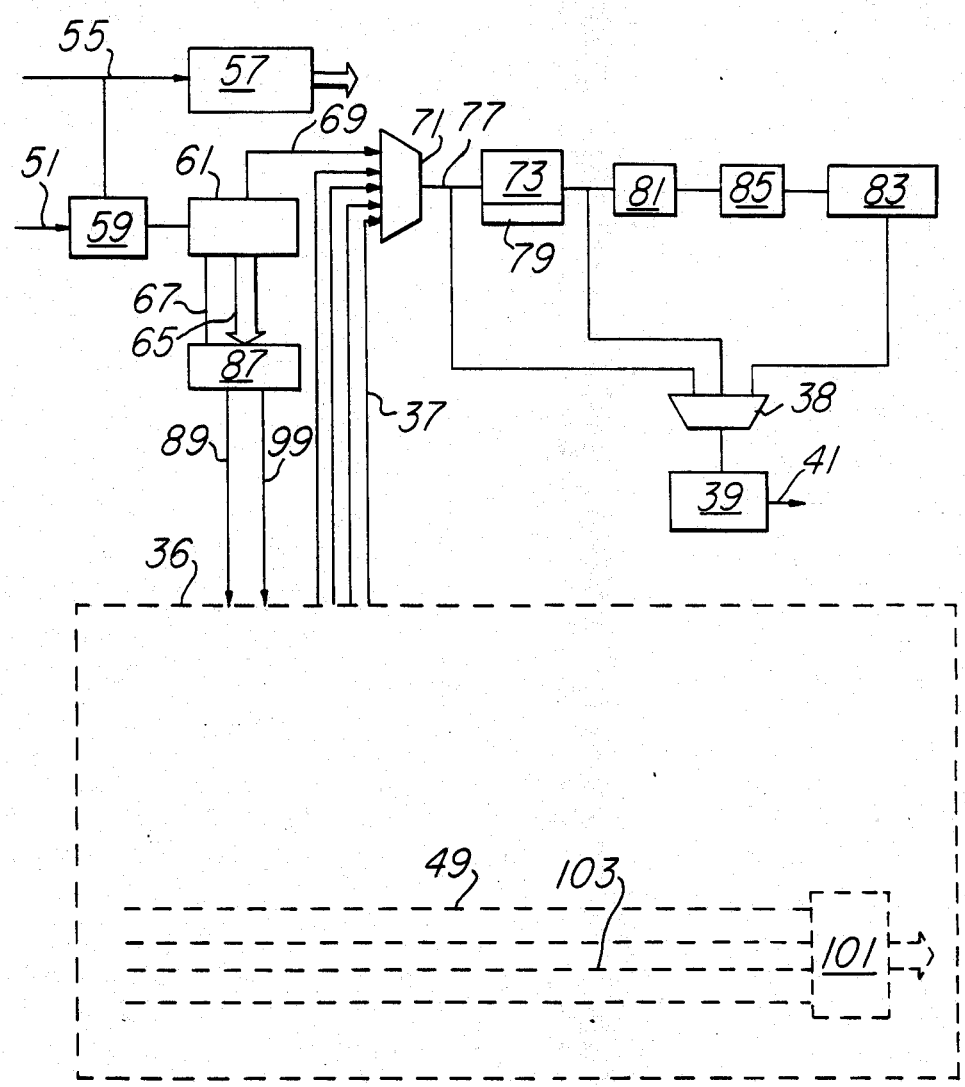
FIG. 6 is schematic circuit diagram of the protocol handler.

The protocol handler 42 as seen in FIG. 6 consists of a converter 59 for converting the incoming data on line 51 which is in Manchester encoded form to transitional form. After conversion the transitional data then enters a 16 baud shift register 61 where the contents are continuously compared against the relevant delimiter sequences by a bank of precharge/discharge nor gates (not shown). In the present case a starting delimiter (SDEL) is received whenever the 16-baud sequence denoted by transitional 1100001001101000000 is detected and an ending delimiter (EDEL) is received whenever the 14-baud sequence denoted by transitional 110110110110x0 where "x" designates a "don't care" baud is received.

Line 55 is coupled to the output of a voltage controlled oscillator (not shown) located on the ring interface circuit chip 40. The latter output has a period equal to one baud on the ring with each half-bit of data being provided on the falling edge of the output on line 55. A phase lock loop on the incoming data stream extracts the baud frequency from the data signals. Receive-/transmit clock generator 57 uses the signal on line 55 to generate the clocks for all of the serial path shift registers and state machines (not shown).

The first two storage cells in the delimiter decoder 61 16-baud shift register are sampled by baud sample latch 87 which is a 2-baud deep shift register. An input sample strobe signal on line 67 is generated by the receive clock generator 57 and applied to sample latch 87 causing the latter to sample the incoming serial data and violation bauds. Clocking on the rising edge of the internally generated baud clock 57 on line 67 results in the output of two signals on lines 89 and 99 corresponding to sampled data and sampled code violations which are the transitionally encoded values of the first and second baud, respectively, for each bit.

Incoming data is also outputted from the delimiter decoder 61 serially on line 69 to one input of a data insertion multiplexer 71. Multiplexer 71 forms a single point of control over data insertion or modification in response to override signals from various state machines in a processor 36 and can force zeroes, ones or data from one of these sources into the serial data stream.

The output 77 from the multiplexer 71 is coupled to the input of both a transmit output multiplexer 38 and to a priority token circuit 73. The priority token circuit 73 inserts a 9-bit delay so that a station can modify the starting physical control field of a token to alter the actual or reserved priorities according to the priority token protocol indicated by the token or frame. This is done when a station wishes to transmit data. Logic circuits 79 associated with the priority token protocol circuit 73 are coupled to the latter and also to the output of a priority token state machine in the processor 36. The output of the priority token protocol circuit 73 goes both to an input of the transmit output multiplexer 38 as well as to a 7.5-baud monitor delay 74 to allow time to eliminate starting delimiters from defective tokens.

The output of delay 81 goes to an elastic buffer 85 which absorbs accumulated phase jitter in the ring. During normal operation, only one station (the monitor) inserts its elastic buffer on the ring. As the accumulated phase delay around the ring varies, it is absorbed by the elastic buffer. The elastic buffer is a 7 plus or minus 6 deep, one baud wide first in-first out (FIFO) which maintains a minimum of 1 baud and a maximum of 13 baud between input and output. The output of the elastic buffer 85 is directed into a second monitor delay 83 which delays the data a total of 22.5 bauds. This delay provides for the minimum ring length required to circulate a free token. With both monitor delays inserted the total delay through the protocol handler is 58 plus or minus 6 baud.

Finally, the output from the second monitor delay 83 forms the third input to the transmit output multiplexer 38. Multiplexer 38 transmits either the output of delay 83, the output from the priority token protocol circuit 73 or repeat data out of output 77. The output from the transmit output multiplexer 38 goes to a transitional to Manchester decoder 39 which converts the encoding of data to Manchester form for transmission on the ring 11.

THe processor 36 contains among other circuits various state machines (not shown) other than a priority token state machine to be described later which have precharge/discharge programmable logic arrays (PLA's) to conserve power for carrying out different control operations. For example, there is a serial receive state machine for controlling operation of the serial receive path, a serial transmit state machine for controlling operation of the serial transmit path, a monitor state machine for controlling the setting of a monitor count bit of a busy or priority free token to maintain the validity of the token, and an address compare state machine that controls recognition of addresses in a received frame. There is a monitor function to examine passing frames and record their status and to mark passing tokens and delete those already marked. There is a receive function which recognizes frames and copies those with appropriate addresses, signals the return of transmitted frames to the transmit state machine and signals successful copy and/or address recognition by setting flag bits at the end of the frame. There is a transmit function to transmit frames in various modes. To accomplish this a token transmission mode must enable the recognition and examination of incoming tokens to determine whether or not to use them.

The total monitor play is split into two sections, one a 7.5-baud first monitor delay 81 and a second 24.5-baud delay 83 after the elastic buffer 85. The majority of the delay is placed after the elastic buffer 85 so as to allow efficient implementation of the elastic buffer clear mechanism. In order to carry out the priority token protocol functions of a token ring local area network data communication system in accordance with the standard protocols for these communications methods published by the IEEE as the 802.5 token ring proposal it is necessary for the priority protocol system to carry out a number of functions in accordance with a defined algorithm. One such algorithm can be developed from the following functions. When one station has reserved a token with a priority reservation "R" greater than the present priority "P" of the token/frame and the station that issued the frame receives it back it must replace the existing priority "P" with the value of "R" and store both "P" and "R" for later use. It must also clear the priority reservation field and the monitor count bit of the token it passes on or issues so that the active monitor does not purge the ring when the modified token passes by. Furthermore, the information stored must be capable of being stacked, unstacked or stored on last in-first out (LIFO) new and old priority indicator storage buffers corresponding to the above-mentioned "R" and "P" values, respectively.

When a given station receives a token which has circulated the ring with a priority equal to the last value pushed onto the "new" LIFO buffer the priority token protocol control must substitute the "old" LIFO buffer value for the priority indicator of the token, leave the priority reservation of the token as is, clear the monitor count bit and "pop" or get rid of the last values stored in both "new" and "old" LIFO buffers.

When a station receives a token which has circulated the ring with the "new" priority, but the priority reservation field indicates that some station wants the priority of the token to be greater than the "old" priority, the priority token protocol control must substitute the "R" for the "P" of the token and the "R" for the last value in the "new" LIFO, and clear the reservation field and monitor count bit of the token.

When a station receives a token or frame for which "P" is less than the last value pushed onto the "new" LIFO buffer an error has occurred either in the values stored on the buffers or by corruption of the ring data through some unknown means. A means must be provided to clear the "old" and "new" LIFO buffers to allow for the first possibility. Error detection circuits take care of the latter possibility.

Finally, a means must be provided to remove the priority protocol control when a station's LIFO buffers are empty and no reservation request greater than zero exists on the token.

Figure 7:
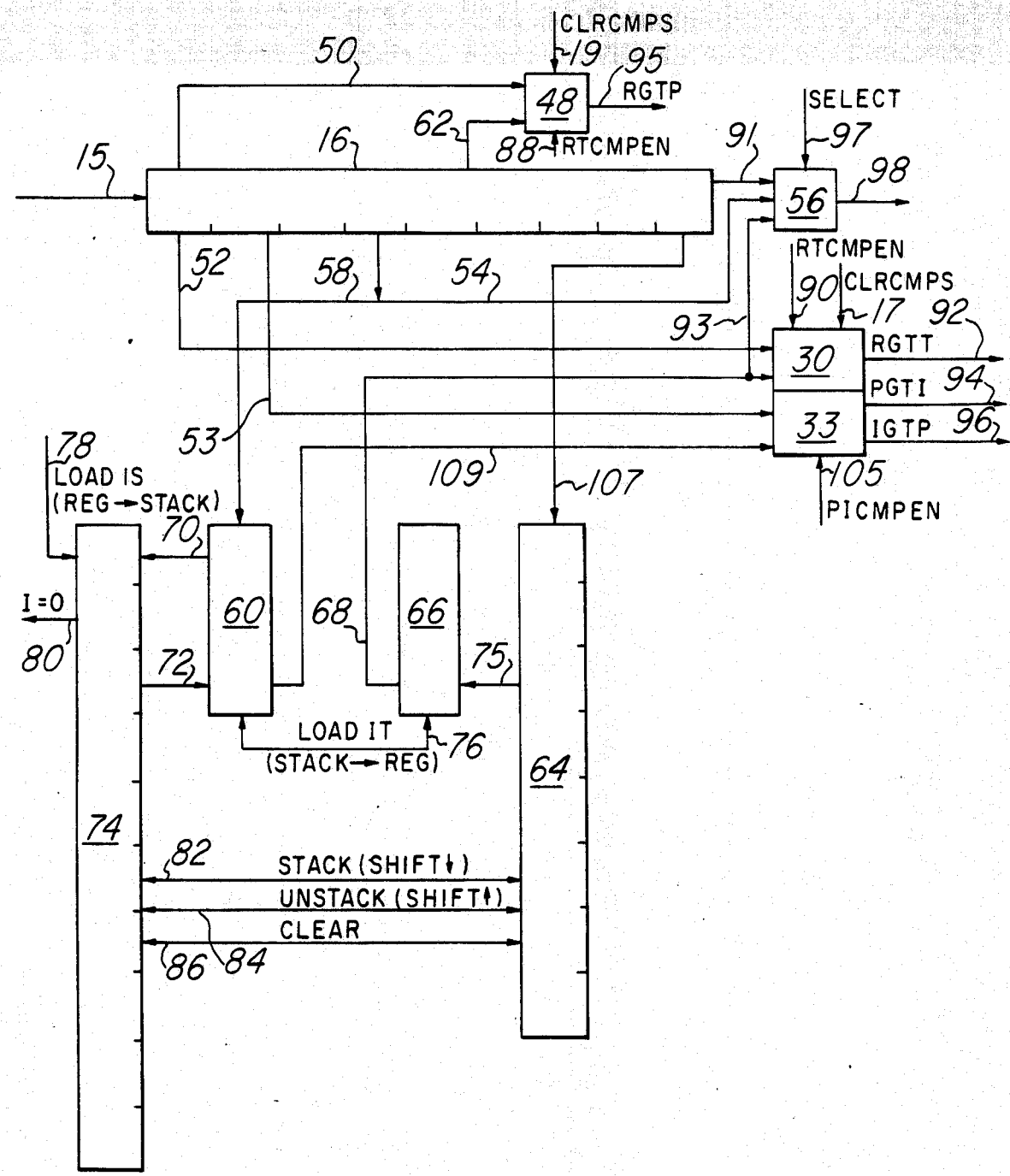
FIG. 7 is a circuit diagram of the priority token data handling circuitry of the access field bits.

The above five functions require evaluation of the comparisons $P>I$, $P<I$, $R>P$, $R>T$, and $I=0$ where I and T are the last values stored in the "new" and "old" buffers, respectively. Logic circuitry for carrying out the above comparisons as shown in FIG. 7 includes a Data-In line 15 coupled to an input of an 18 baud shift register or delay 16 as well as to first inputs of serial comparators 18 and 30. Since R must be compared with P before any decision can be made as to the value of the outgoing priority indicator, at least 8 bits of delay must be used. An extra bit of delay is used to allow the R versus P comparison to be completed one clock cycle before P arrives at the output of the shift register 16. Taps are made at the midpoints of bits 1, 2, 4, 6 and 9 of shift register 16. The tap at the first bit goes by line 50 to one input of comparator 18 and by line 52 to an input to comparator 30. the tap at the second bit goes to a first input of serial comparator 33 while that at bit 4 goes by line 54 to an input to multiplexer 56 and by line 58 to III register 60.

The tap at the sixth bit goes to a second input of serial comparator 18 by line 62. The tap at the ninth bit goes by line 107 to an 8 bit LIFO (last in first out) TTT stack 64. Coupled to TTT stack 64 is a TTT register 66 which receives the first and most significant bit of the first three priority bits of a frame and transfers it into the most significant bit position of TTT register 66. The midpoint of the latter bit, in turn, is coupled by line 68 to a second input to serial comparator 30.

The III register 60 is coupled by transfer lines 70 and 72 to a 10 bit III LIFO stack 74. III register 60 parallel transfers its 3 bits into stack 74 along line 70 and the first 3 bits of stack 74 into the III register 60 along line 72 in response to control signals on lines 76 and 78, respectively. The "I" values in III register 60 are taken one bit at a time along line 109 to an input of comparator 33. A transfer control signal on line 76 also initiates the parallel transfer along line 75 of the first 3 bits in the TTT stack 64 into the TTT register 66. Control signals STACK, UNSTACK and CLEAR on lines 82, 84 and 86, respectively, cause the stacks 64 and 74 to shift up, shift down and to clear. The bottom bit of TTT register 66 is directed along line 68 to a second input of serial comparator 30 and also to a third input of multiplexer 56.

Comparators 18 and 30 and 33 are each controlled by a CLRCMPS signal on lines 19 and 17 which clear the comparators 18 and 30 and 33 and an RTCMPEN signal on lines 88 and 80 which enable comparators 18 and 30. An output RGTP appears on line 95 as soon as a bit of the three bit priority reservation field of an incoming frame is greater than a corresponding bit of the three bit priority indicator field of that frame. A RGTT output from comparator 30 appears on line 92 whenever the reservation value "R" of a token exceeds the last value of priority stored in the TTT register 64. An PGTI signal appears on line 94 when the priority indicator value "P" is greater than the last priority value stored in the III register 60 and an IGTP signal appears on line 96 when the last value stored in the III register 60 exceeds the priority indicator value "P". If neither is set "I" must equal "P".

The output of bit 9 of the shift register 16 is directed on line 91 to an input of multiplexer 56 which is transmitted to the output on line 98 by an FMODCTL signal on SELECT line 97. The reservation bits are directed on line 54 to an input of multiplexer 56 which is transmitted to output line 98 on an FMODCTL*UNSTACK signal on SELECT line 97. The last stored value of priority in TTT register 64 is directed to a third input to multiplexer 56 on line 93 which transmits to output 98 in response to a FMODCTL*UNSTACK on SELECT line 97. An I=0 signal from III stack 74 is obtained on line 80 to indicate that the LIFO buffers are empty. A LOADIS signal on line 78 causes the top 3 bits of III stack to parallel load from III register 60. The outputs on lines 95, 92, 94 and 96 are all directed to a fairness state machine shown in FIG. 9 which provides outputs that are governed by the inputs as well as the states through which the machine circulates. Output line 98 couples to a monitor delay circuit 81.

Operationally the fairness state machine and delay is responsible for changing the priority field of the physical control field of tokens on the local area network (LAN) as required by the state of the priority and reservation fields of that token and by the history of the fairness machine itself. Fairness is introduced only once a free token has been released. The latter event takes place when the source address of an incoming frame is matched to the station or adapter address in the address state machine and associated circuitry (not shown). Since it is necessary to receive when transmitting in order to at least be in a position to decode a station's own source address in the event a token returns to that station before transmission has ended it is necessary for the priority token machine to operate off of the transmit clock as opposed to the receive clock (not shown).

Figure 8:
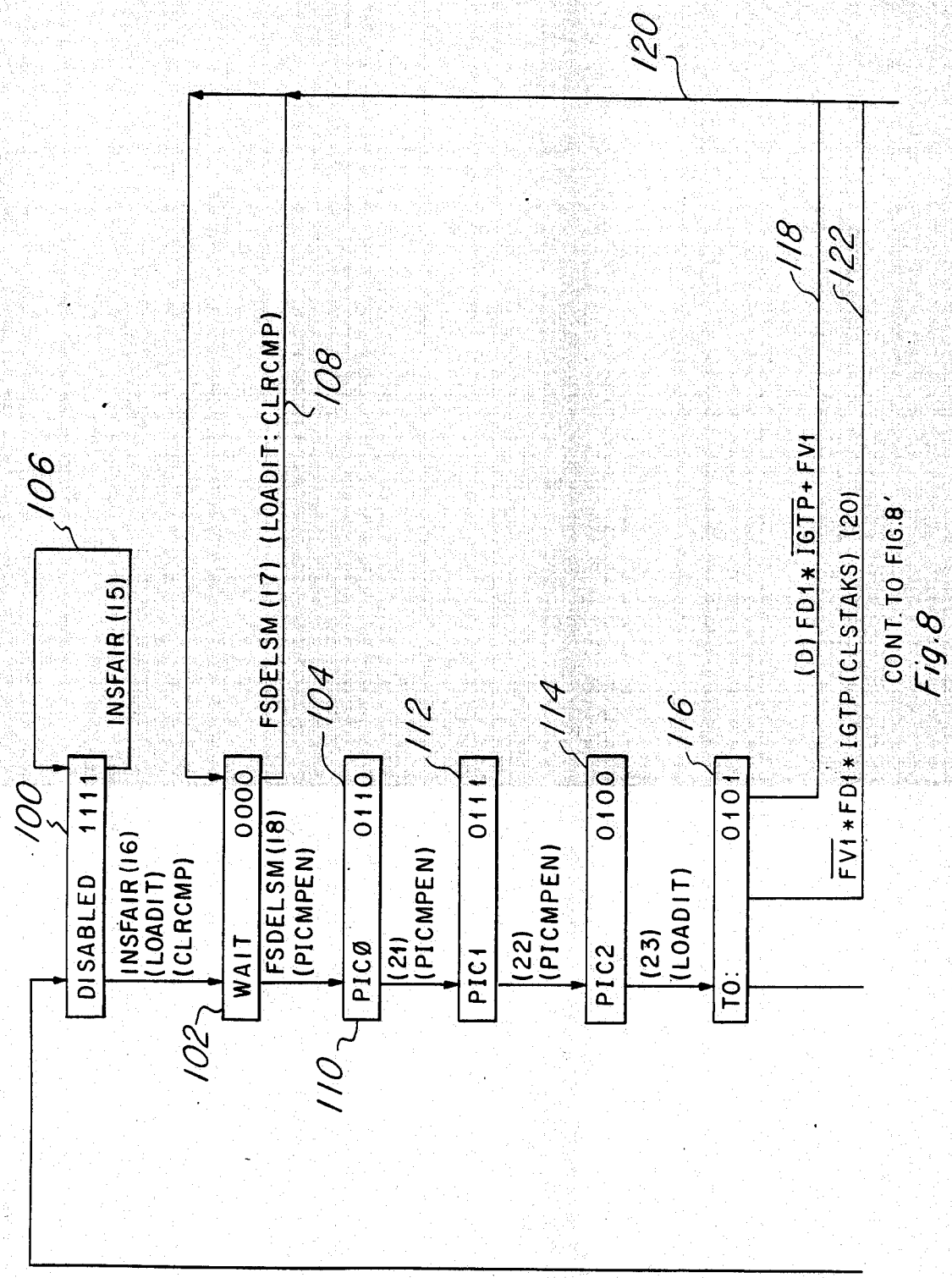
FIG. 8 is a flow diagram of the sequence of states and associated inputs and outputs of the priority token state machine.
Figure 8:
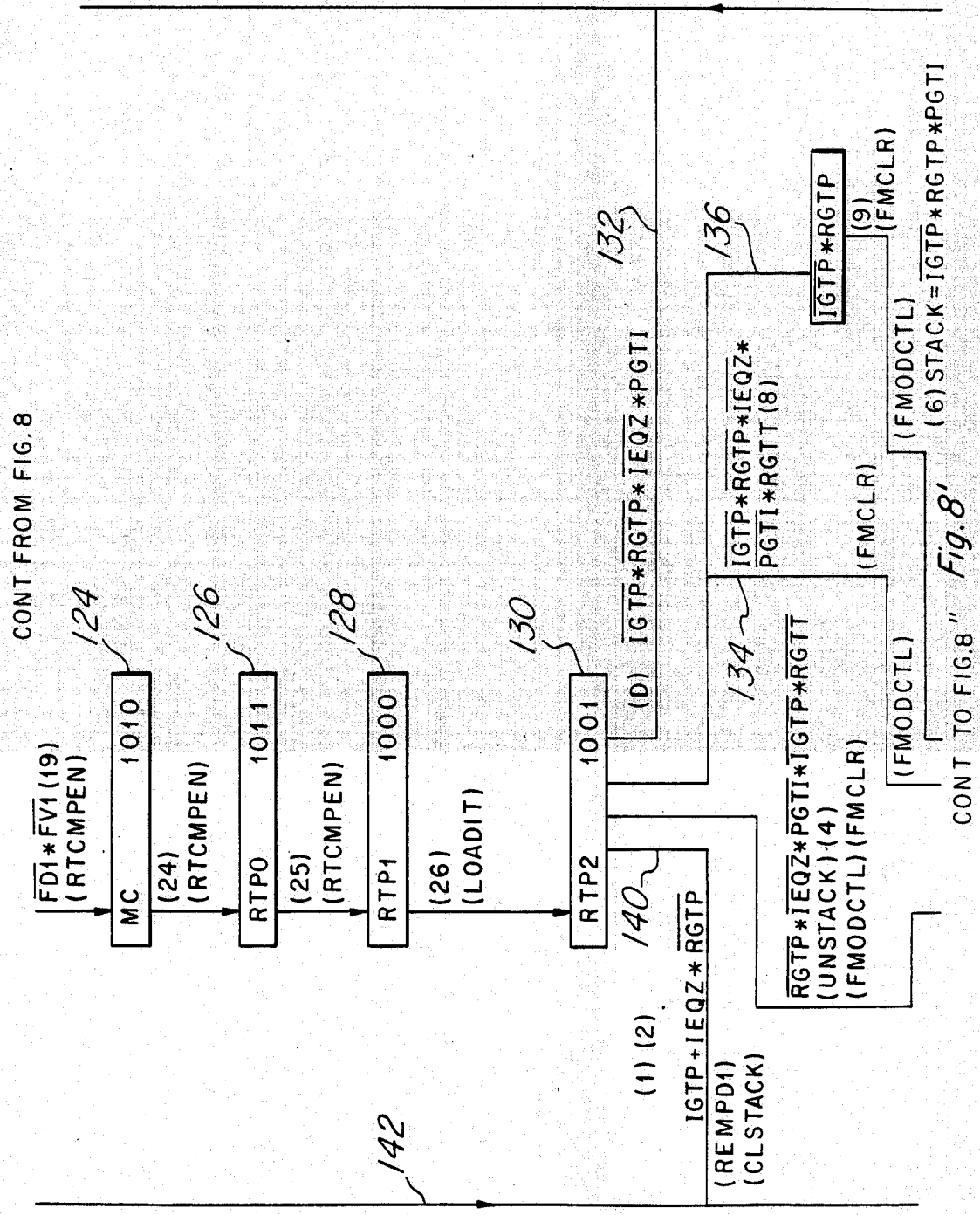
Figure 9:
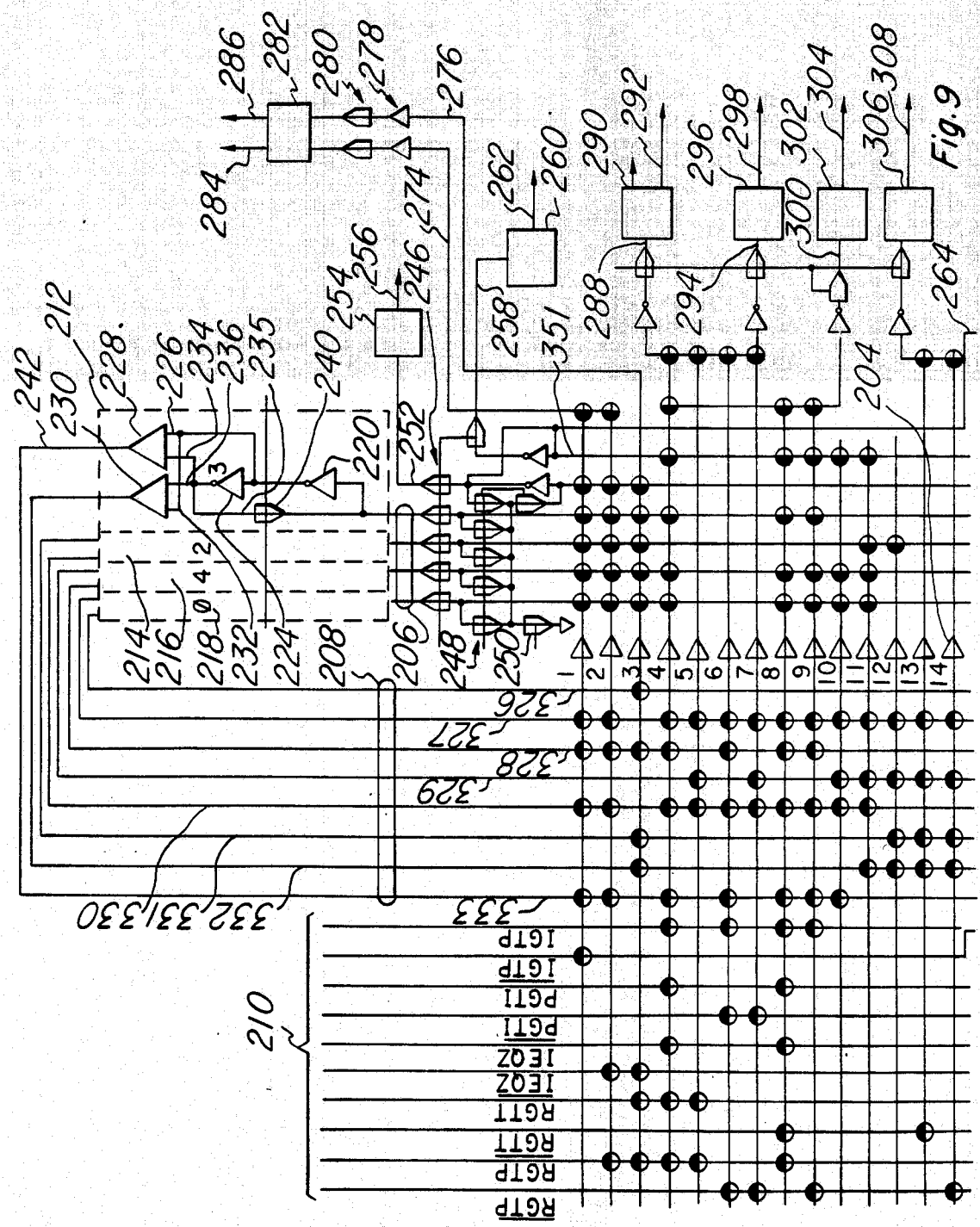
FIG. 9 is a circuit diagram of the priority token state machine.
Figure 9:
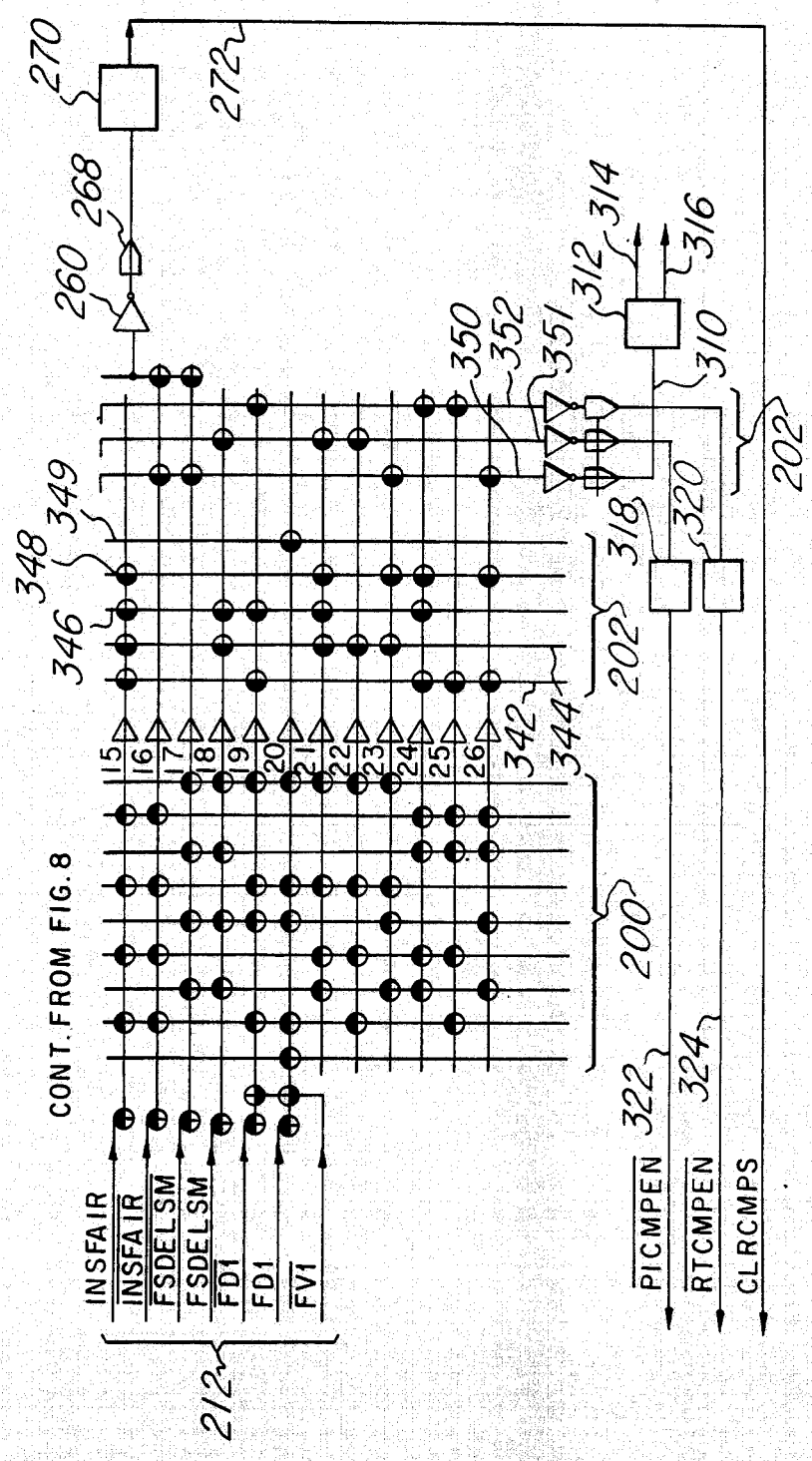

The interaction of the logic circuitry of FIG. 7 with the priority token state machine shown in FIG. 9 can be understood by reference to the sequence of functions of the priority token state machine as set forth in FIG. 8.

Once a station issues a free token it issues a INSFAIR signal (see FIG. 8) which causes the state machine to go from a "disabled state" 100 in which it follows a loop 106 to follow a path to a "wait" state 102. At the same time the state machine issues CLRCMP and LOADIT signals which clear the comparators and parallel transfer the top 3 bits of both the III stack 60 and the TTT stack 64 into their corresponding registers 60 and 66, respectively. The CLRCMP and LOADIT signals are now repeated each clock cycle as the system circulates about path 108 in response to FSDELSM signals. Once a start delimiter pulse is detected (indicated by FSDELSM) the priority token state machine goes to PICO state 110 issuing a PICMPEN signal to activate comparators 33 and to initiate comparison of the 3 bits of the priority indicator of the token/frame with corresponding bits of the "new" or III register 60 proceeding from the most to the least significant bits in going from states PIC1 112 and PIC2 114. Following this another LOADIT signal is generated which parallel transfers the top 3 bits of the III stack 74 and TTT stack 64 into the III register 60 and TTT register 66, respectively. The priority token state machine goes from TOK state 116 to any one of three possible states depending upon the input signals present. If either there is a code violation (FVI) or the bit in position 1 of positions 0 to 13 of the priority token delay is "1" indicating a busy token as the Token Indicator bit is in this position at this time and the value in the III register 60 is less than or equal to the priority value of the token/frame then default path 118 is followed back to the "wait" state 102. Path 122 leading back to the "wait" state 102 is taken if there is no code violation (i.e. FV1 implies it is a good token) and it is a busy token and the last value stored in the III register 60 is greater than P. The latter condition implies that the token priority has been corrupted as normally P can not be less than the last value pushed onto the III register 60 by the station. In this case the fairness state machine issues a CLSTAKS signal which clears the III and TTT stacks 74 and 64, respectively, before returning to the "wait" state.

The path leading to state MC 124 is taken if the token is not busy and it has no code violations. In the latter case the state machine issues an RTCMPEN signal which enables comparators 18 and 30. The state machine then issues two more RTCMPEN signals to allow comparison of the second and third bits or reservation field with corresponding bits of the priority field and the TTT register 66 as it passes through RTPO state 126 and RTP1 state 128. Once again a LOADIT signal is generated parallel transferring the top 3 bits of the stacks 74 and 64 to their corresponding registers 60 and 66, respectively as the state machine moves to RTP2 state 130.

From RTP2 state 130 any one of 5 paths are possible depending upon the inputs. The default input along line 132 is taken if the value "I" in the III register 60 is less than "P" of the token, I is nonzero and "R" is less than or equal to "P". These conditions imply that the token has had its priority bumped up by another station and so the priority of the token must be reduced first by the bumping station. Thus, the fairness state machine returns to the "wait" state 102. Path 140 is taken in the event "I" is greater than "P" or "I"=0 and "R" is less than equal to "P". The first condition indicates the "P" value of the token has been corrupted while the second condition indicates the stacks 74 and 64 are empty and no station has requested a reservation greater than the priority indicator of the token. In this case a return along path 142 to the "disabled state" 100 is made and fairness is removed.

Path 138 is taken if the input conditions are "R"less than equal to "P" and less than or equal to "T", "I" equal to "P" and "I" not equal to 0. These conditions indicate that a token has circulated the ring with a priority equal to the last value pushed onto the III register and that the return reservation value R does not require any further state machine action. Thus, the previous token state is restored. The priority token state machine substitutes the last value "T" stored in the TTT register for "P" of the token by issuing a select signal on line 97 to select line 93 into the multiplexer 56 for transmission so that the priority field of the token is substituted for by the "T" value aforesaid. The latter control signal is derived from an FMODCTL signal from line 262 of the state machine and an UNSTACK signal from line 292 of the fairness state machine fed into an "and" circuit to form a signal FMODCTL*UNSTACK. The fairness machine leaves the reservation value "R" of the token the same, clears the monitor count bit through the issuance of an FMCLR pulse from line 304 of the fairness state machine. The fairness machine applies the signal FMODCTL*UNSTACK to the SELECT line 97 of the multiplexer 56 and the signal UNSTACK on line 84 to stacks 74 and 64 three successive times in going along paths 138, 148 and 154. As a result all three bits of the "T" value are transmitted through multiplexer 56 and the stacks are shifted up a total of 3 bits thereby "popping" the last value stored inn each stack. Path 134 is followed provided the inputs are "I"="P", "R" is less than or equal to "P", "I" is not zero and "R" is greater than "T". These conditions indicate that the token has circulated the ring with a priority equal to the last value pushed onto the III registor 60 and some station wishing to transmit has issued a reservation "R" greater than the old priority value stored on the TTT stack 64. The fairness machine substitutes "R" for "P" on the token by issuing an FMODCTL signal from output 262 of the state machine which is directed to select line 97 of multiplexer 56 and results in the selection of input from line 54. In addition, an FMCLR signal generated on output 304 clears the monitor count bit 60. The "R" value is also loaded into the III register 60 along line 58. The reservation of the token is zeroed by the FMODCTL signal causing the multiplexer 56 to transmit zeroes over this field of the token.

Path 136 is followed if the inputs are "I" less than or equal to "P" and "R" greater than "P". SUch inputs indicate a new token priority level is to be put into the III stack 74. This may require replacement of the last value stored previously or retention of the last stored value is required. In this case an FMCLR signal is generated on line 304 which clears the monitor count, and FMODCTL signal is issued on line 262 and a stack signal is generated on line 298. The latter signal shifts the bits in the III and TTT stacks down on bit position. Paths 146, 152 and 158 are followed and in paths 146 and 152, the stack operation is repeated so that a total shift of 3 bit positions accors. In path 158 the LOADIS signal is generated which parallel transfers the 3 bits in the III stack into the 3 top bits (now empty) of the the III stack. The FMODCTL signal together with the STACK signal causes the line from the output of the 9th bit position of delay 16 to be transmitted through the multiplexer 56 thereby retaining the old priority indicator.

If R is greater than P and I equals P (or not if I does not equal P) then again paths 146, 152 and 158 are followed except that now there is no STACK signal generated. In this case the LOADIS signal causes the last stored "I" value to be overwritten by the reservation value in the III register 60. The FMODCTL signal together with a STACK signal causes transmission of the T value in the TTT register from line 93 to output line 98. In both of the latter two cases the system returns by path 120 to the "wait" state 102.

In going along path 138 and paths 148, 154 and 160 if the III stack is empty after popping its last stored value then path 142 is followed. In this case an REMPD2 signal is issued on line 286 which causes the removal of the priority token delay 16 from the data path (not shown). A CLSTAKS signal is also issued on line 256 which clears stacks 74 and 64 by application to line 86.

The priority token state machine shown in FIG. 9 performs the various functions set forth in the flow diagram of FIG. 8. In order to simplify the diagram block diagrams have been used to designate driver circuitry which may incorporate several components but which an ordinary skilled person can easily design. The priority token state machine shown consists of a plurality of field effect transistors (FETS) arranged in a plurality of columns and rows to form an AND plane 200 and an OR plane 202 the rows of which are each coupled together by a gated clock 204 shown in simplified form. The function of the latter is simply to apply a high voltage to its corresponding row line in the AND plane 200 once each clock cycle NTCLK and to transmit a high output once each clock cycle TCLK (the complement of NTCLK) if none of the FETS have fired due to inputs on lines 210 or 212 being present. The FETS have been designated by circles half of which are dark and the other half light. Each FET in the AND plane 200 has its gate connected to a corresponding column line and its source-to-drain path connected between the associated row and ground. In the OR plane each FET has its gate connected to a corresponding row line and its source-to-drain path connected between an associated column line and ground. In addition to the previously mentioned input lines the AND plane 200 has lines 326, 327, 328, 329, 330, 331, 332, and 333 which correspond to the present state of the machine. Lines 326, 328, 330, and 332 correspond to the most to least significant "1" bits, respectively, while lines 327, 329, 331, and 333 correspond to the most to least significant "0" bits, respectively. Thus, for example, row 1 is in the 1001 state.

Lines 342, 344, 436, and 348 generally designated as next state lines 206 in the OR plane 202 correspond to the next state to which the state machine will move after the present state. The presence of an FET on one of these lines indicates a binary "1" bit while the absence of an FET indicates a binary "0" bit. Thus, for example the next state after leaving the 1001 state is the 1111 state given the inputs on row 1 (or on row 2). Each of the columns 206 corresponding to the next state couple to a pair of complementary present state lines on the AND plane 200 through a circuit such as is shown in block 212. The circuits in blocks 214, 216, and 218 are all identical to that of block 212. Line 348 is connected through a corresponding source-to-drain path of a field effect transistor 246 to and inverter 220 the output of which couples to the input of another inverter 224 and to an inverting input of a driver 228 and a non-inverting input of a second driver 230. Drivers 228 and 230 are simply a push-pull pair. The output of inverter 224 goes both to a non-inverting input of driver 228 and an inverting input of driver 230 as well as through transistor 240 to refresh the input of inverter 220. The output of driver 228 goes along line 242 to input line 333 while that from driver 230 goes along line 244 to input line 332. Transistors 248 and 250 operate on each NTCLK clock cycle to ground lines 342, 344, 346, 348, 349, 351 and 264.

Output column line 349 goes through an inverter driver and gated transistor 246 to circuit 254 which produces a CLRSTK signal on line 256 whenever either input line IGTP is low (and therefore complementary input line IGTP is high) or input line IEQZ is low and RGTP is low.

Output column line 351 goes through an inverter and a gated one of transistors 246 along line 258 to an FMODCTL driver 260 which produces the FMODCTL signal on its output line 262.

Lines 274 and OR plane row line 3 are directed by lines 274 and 276, respectively, into inverters 278, through gated transistors 280 into driver circuit 282 to produce the NREMFD1 and NREMFD2 signals on lines 284 and 286, respectively.

A column line coupled to the last FET's on OR plane rows 4 and 5 couple through an inverter and gated transistor to line 288 which is the output of UNSTACK driver circuit 290 which produces the UNSTACK signal on output line 292.

Similarly, a column line coupled to the last FET's on OR plane rows 6 and 7 go through an inverter and gated transistor to line 294 which is the input to STACK circuit 296 which produces the STACK signal on its output line 298.

The second last transistors on OR plane rows 4,9 and 10 are coupled to a column line which couples through an inverter and gated transistor to line 300 which inputs to FMCLR driver 302 that produces the FMCLR signal on its output line 304 in response to the aforesaid column line going low.

A column line coupled to the transistors on OR plane rows 13 and 14 connect through an inverter and gated transistor to LOADIS driver 306 on whose output line 308 there is produced the LOADIS signal in response to the latter column line going low.

The column line coupled to the last transistors on OR plane rows 16 and 17 connect through an inverter 266 and gated transistor 268 to CLRCMP circuit 270 which produces a CLRCMP signal on line 272 in response to the latter column line going low.

Column line 350 goes through an inverter and gated transistor to line 310 which forms the input of LDSHFT circuit 312 which produces a LOADIT signal on line 314 and a SHIFTIT signal on line 316. The SHIFTIT signal is produced on every clock cycle that the LOADIT signal is not generated and is used to shift bits down the registers 60 and 66 on a continuous basis.

Column lines 351 and 352 in a similar manner feed into drivers 318 and 320 to produce PICMPEN and RTCMPEN signals on lines 322 and 324, respectively.

By way of example, if the state machine is in the disabled state 100 whose present state in binary form is 1111 as is indicated by rows 15 and 16, it responds to inputs INSFAIR on row 15 and INSFAIR on row 16. If the input INSFAIR is high INSFAIR will be low line 16 will be high and column lines 350 and 264 go low (all of the column lines are connected through depletion mode transistors {not shown} to a high voltage) resulting in a signal LOADIT on line 314 and a CLRCMP signal on line 272. As the next state indicated on row 16 is that defined by binary 0000 the state machine proceeds to that state which is "wait" state 102. Thus, it is relatively easy to follow the state machine from one state to another if the inputs are known or through various alternative paths for various possible inputs.

By making the architecture of the fairness system serial, serialized values of "P" and "R" can simply be tapped off of the fairness delay 16 without the need to include "P" and "R" hold latches. In addition, serial magnitude comparators can be used, which are inherently simpler than their parallel equivalents. The LIFO stacks become simple shift registers as stacking and unstacking become serial operations. Modification of outgoing data is also easily accomplished by feeding delayed values of data, "R" and "T" into a 3 to 1 multiplexer rather that using 3 multiplexers as would be required for a parallel system.

By making a judicious choice of bit significance in the stacks the length of the stacks can be reduced. Because of the protocol there is only one combination of stacked "1"'s and "T"'s that needs four levels to be stacked. These are the following:
III stack=111:101:011:001
TTT stack=110:100:010:000
By reversing the bit order in each triplet one gets the following:
III stack=111:101:110:100
TTT stack=011:001:010:000
Thus, only 10 III stack bits are necessary and 8 TTT stack bits.

Figure 10:
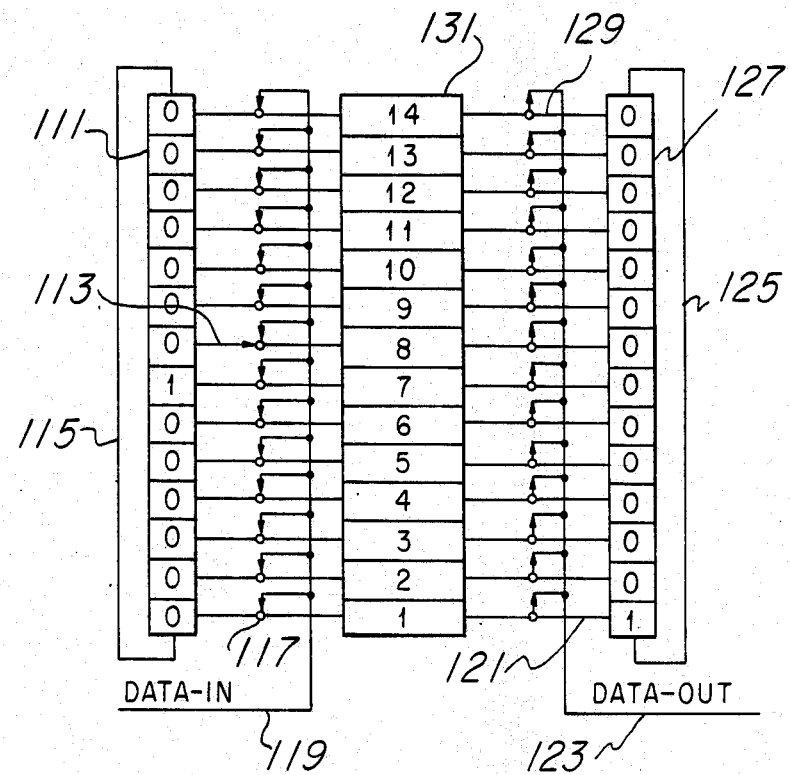
FIG. 10 is a schematic diagram of the elastic buffer input and output pointers and the data registers controlled by the former.

Referring to FIG. 10, the elastic buffer includes a series of 14 data registers 131 which have their respective inputs connected to outputs of associated input gates 117 the inputs of which couple to a Data-In line 119. Each gate 117 is controlled by a gating pulse from a circulating pointer register 111 having 127 bit locations. The overflow from the top end of the circulating register 111 is directed back to the lowermost location by input feedback line 115. A "1" bit in any given bit location will enable the associated gate of input gates 117 and permit it to pass data into the corresponding data register of registers 131.

Similarly, outputs of each data register cell of registers 131 connect to associated ones of 14 output gates which are controlled by an output circulating pointer 127. When the output pointer 121 is alongside a stage of pointer 127 having a "1" data passes through the associated gate from the corresponding data register cell of registers 113 of Data-Out line 123. As with the input circulating register 111, the output circulating pointer 127 moves sequentially from the bottom stage to the top stage, and overflow onto feedback line 125 being directed back again to the lowermost stage.

Figure 11:
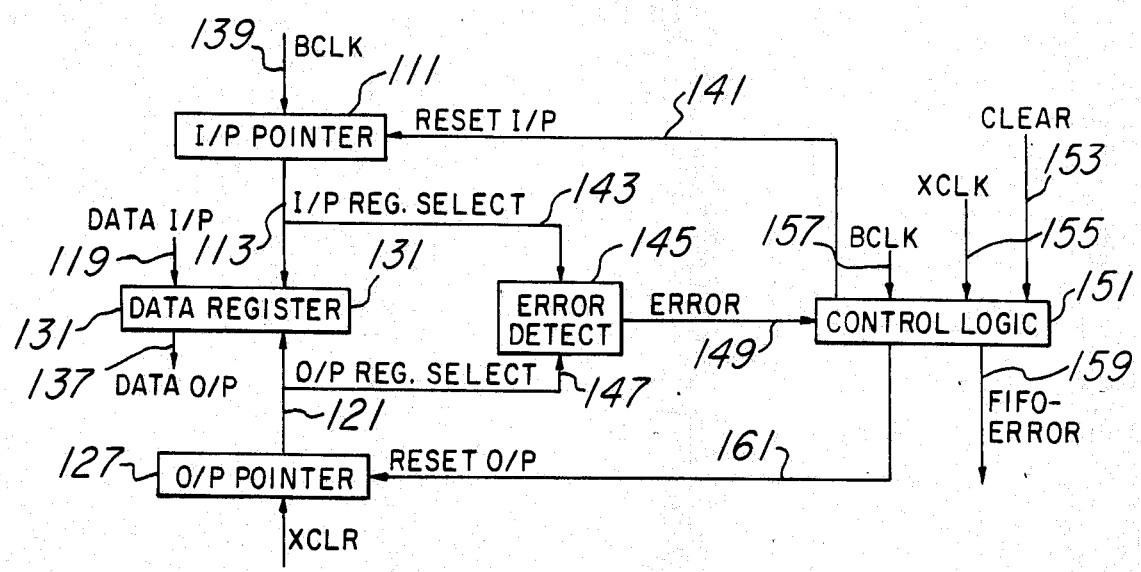
FIG. 11 is a block diagram of the circular FIFO buffer shown schematically in FIG. 10 including the error detect system.

A more complete schematic diagram of the circular FIFO (first-in first-out) buffer shown in FIG. 11 indicates more completely the function of the former. In this case both the input register select signal on line 113 from the input pointer 111 as well as the output register select signal on line 121 from the output pointer 127 are coupled by lines 143 and 147 to an error detect circuit 145 which simply produces an output signal on ERDET line 149 whenever signals are present contiguous input and output reg. select lines 113 and 121. The output of the error detect circuit 145 goes to a control logic circuit 151 which sends reset signals on input and output reset lines 141 and 161 to reset the input 111 and output 127 pointer circuits. Two clock signals are directed to the control logic circuit 151 namely, BCLK on line 157 and XCLK on line 155. A clear signal one line 153 is also input to the control logic circuit 151.

Whenever an ERDET signal is received on line 149, circuit 151 generates an input reset signal on line 141 on a clock pulse of BCLK and an output reset signal on line 161 on a clock pulse of XCLK. In addition, circuit 151 issues an FIFO error signal on line 159. Upon receipt of respective reset signals input and output pointers 111 and 127 reset to their initial conditions in which a "1" is placed in two cells each register in positions such that there are 6 bit positions between but not including the "1"'s. For example, the input "1" may be put into position 1 and the output "1" into bit position 8 so that each "1" would have to move ahead 7 positions to reach the same relative position as the other bit. Thus, there are 6 stages in which zeros are stored between the positions of stages in which "1"'s are initially stored.

Figure 12:
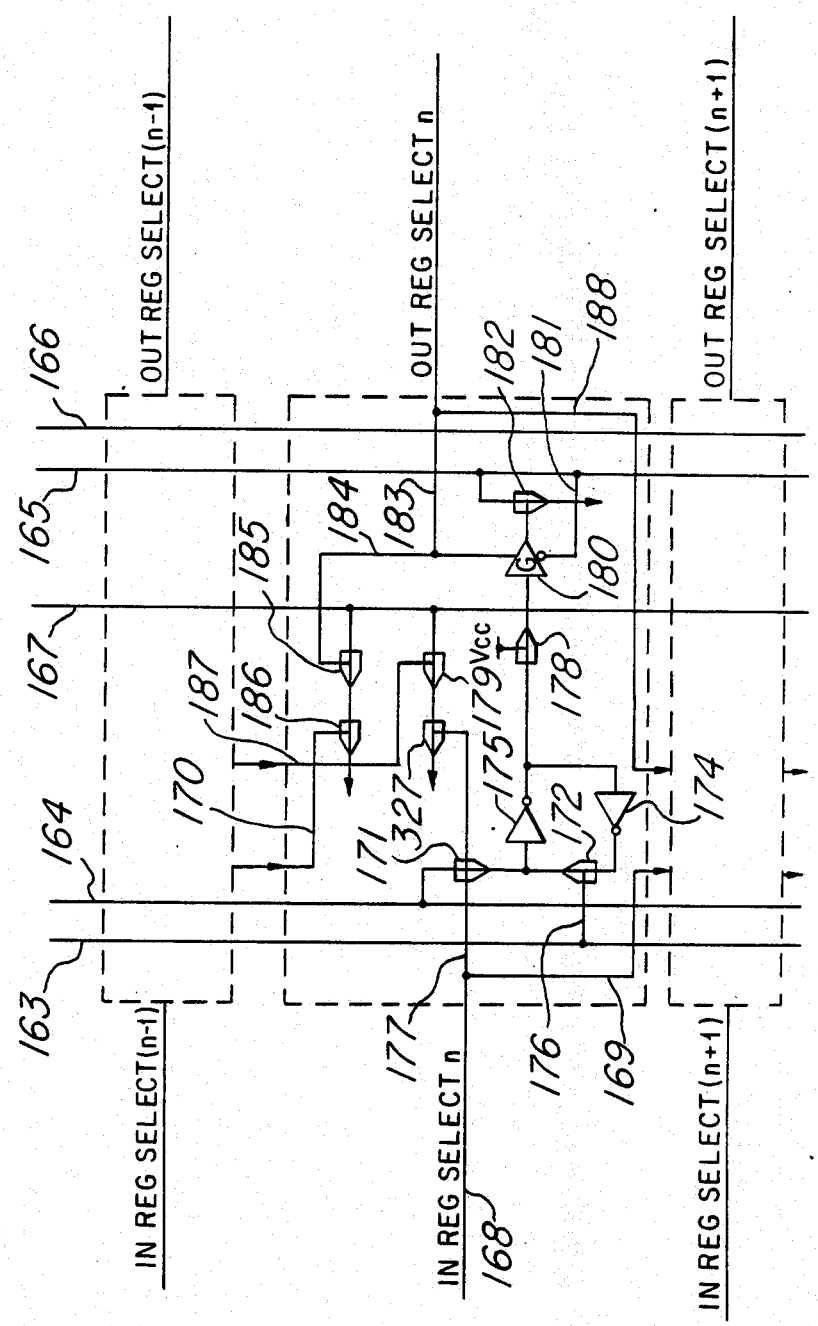
FIG. 12 is a circuit diagram of one of the cells of the data registers in a contiguous access detect arrangement.

Referring to FIG. 12 there is shown a representative cell of one of the 14 cells of the data register 131. In this case an input register select signal from the input pointer circuit is received on line 168 whenever the pointer is opposite a "1" bit. This logic "1" signal is applied to the gate of transistor 171 as well as to transistor 327 turning on both of the latter transistors. Thus, data arriving on Data-In line 164 passes through transistor 171 and is inverted by inverter 175 onto line 173 Inverter 174 inverts the inverted data signal and refreshes the latch input on each BCLK pulse on line 163. The inverted data signal on line 173 passes through transistor 178 whose gate is connected to Vcc to the input of gated clock 180. Gated clock 180 which is a bootstrapper clock driver is clocked by an output register select signal on line 183 which is capacitively coupled to the input and drives the input above Vcc thereby causing transistor 178 to stop conducting. The rapid and large rise on its input voltage causes its output to turn on rapidly and drive transistor 182 on. When transistor 182 turns on, it couples the Data-Out line 165 to ground until an XCLK signal pulls down gate 180. Conversely, a low output signal turns off transistor 182 and allows it to float or be charged up to a preselected voltage.

In the event that the output pointer is alongside the data register (i.e. on line 183) and the input pointer is on the input line of the previous data register then both lines 184 connected to the gate of transistor 185 and line 170 connected to the gate of transistor 186 will be high and clamp error detect line 167 to ground. Similarly, whenever the input pointer is alongside the data register (i.e. on line 168 and the output pointer is opposite the previous data register then both lines 168 and 186 will go high and turn on transistors 327 and 179 thereby grounding error detect line 167. The grounding of error detect line 167 results in the reinitiallizing of the circular FIFO's, clearing of the pointers and triggering of an error log circuit. This is accomplished by feeding the error detect signal to a synchronizer circuit which synchronizes this signal to both BCLK and XCLK in order to clear the pointers 111 and 127.

Figure 13:
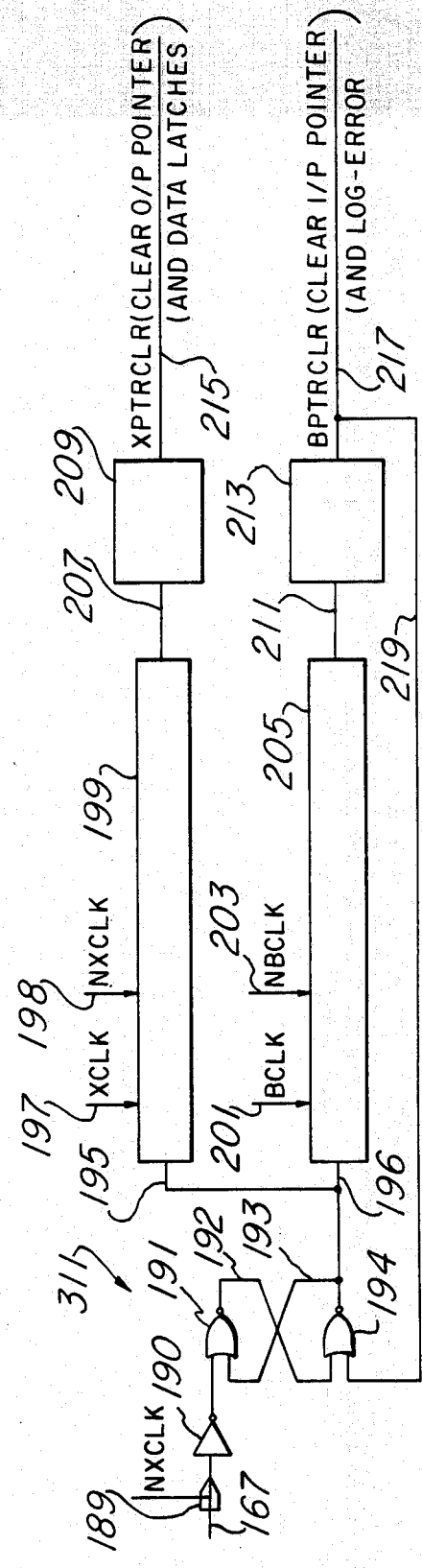
FIG. 13 is a block diagram of the synchronizer system for the elastic buffer.

The synchronizer system as shown in FIG. 13 generates an XPTRCLR signal 2 cycles after the first XCLK signal following entry into latch 311 which resets the output pointer. After 3 cycles of BCLK following entry into latch 311 of a "1", a BPTRCLR signal is generated to clear the input pointer. The additional 1 cycle of delay ensures that the output synchronizer has seen and processed the set/reset latch 311 signal by the time the BPTRCLR signal resets the latch 311.

The synchronizer system of FIG. 13 consists of a transistor gate 120 controlled by NXCLK clock which passes the error detect signal on line 167 through to the input of inverter 190 on each such clock signal. The inverted signal from inverter 190 drives a set/reset latch 311 consisting of NAND circuits 191 and 194 cross coupled by lines 192 and 193. A logic "0" signal on error detect line 167 results in a logic "1" signal on line 193. The latter signal is fed in parallel by lines 195 and 196 into synchronizers 199 and 205 which effect 2 and 3 cycles of delay, respectively, and transmit on XCLK and BCLK clock signals, respectively, by lines 207 and 211 to rising edge detectors 209 and 213, respectively. The rising edge detectors 209 and 213 ensure that the pointers are cleared only once and allow the input pointer clear signal to be used as a log-error signal. The input and output pointers provide outputs on lines 215 and 217, respectively. The 3 cycles of delay on the BCLK synchronizer circuit 205 ensures that the XCLK synchronizer circuit 199 has detected and dealt with the signal on line 195 before the BPTRCLR signal on line 217 clears the latch 311.

Figure 14:
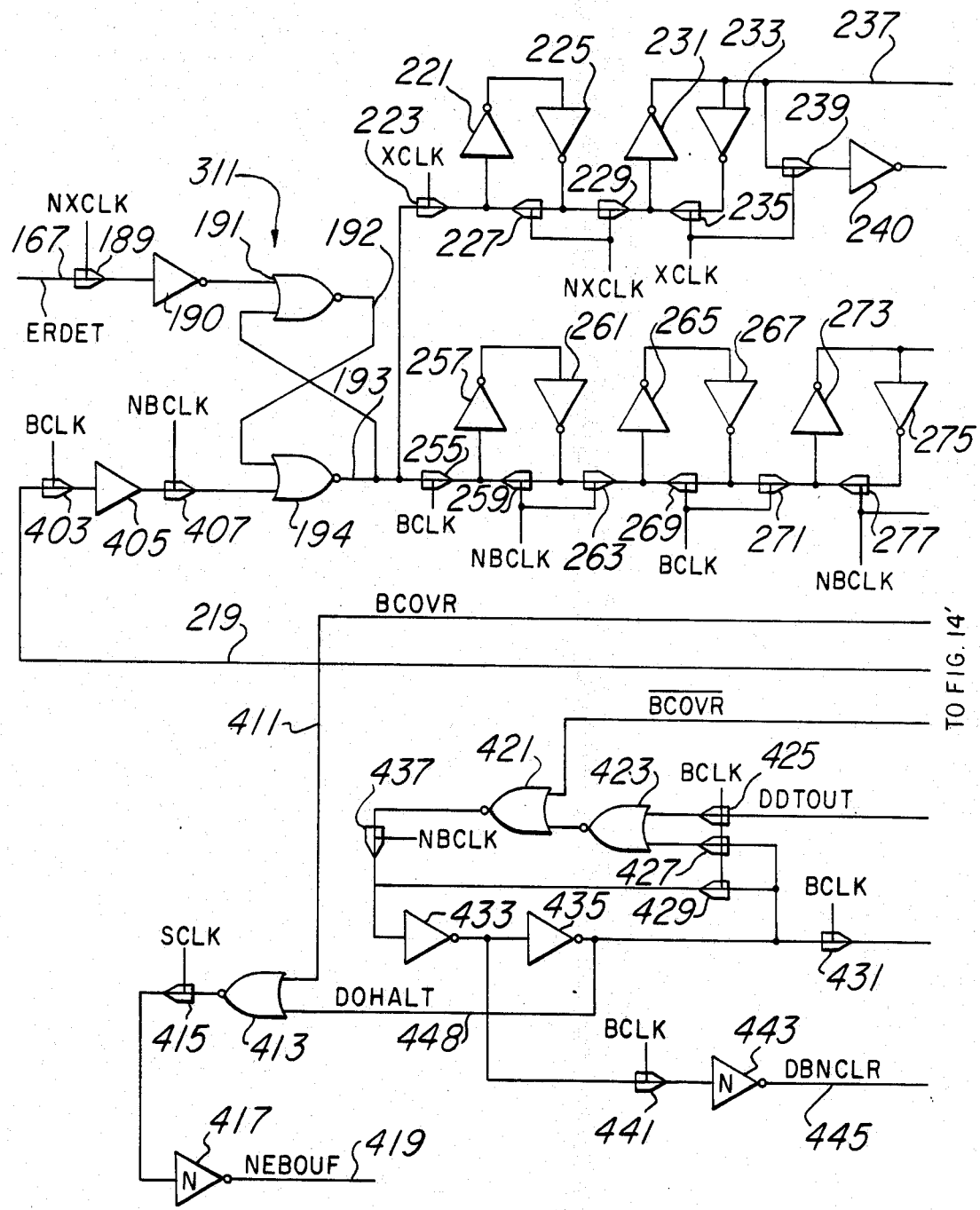
FIG. 14 is a more detailed circuit diagram of the synchronizer system for the elastic buffer.
Figure 14:
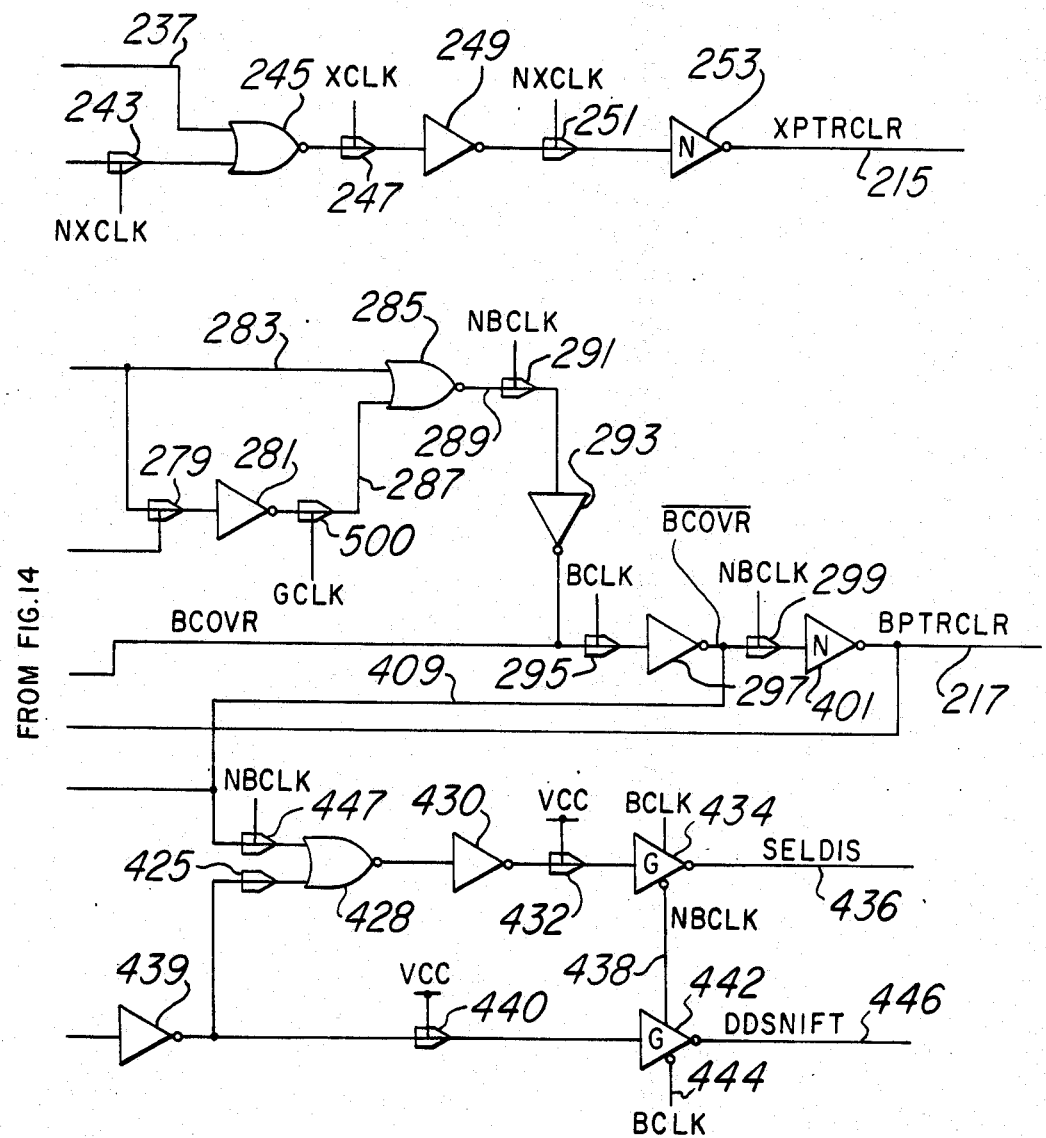

A more detailed circuit showing the synchronizer system of FIG. 13 as well as circuitry for generating various control signal is shown in FIG. 14. In this case the output from the set/reset latch 311 is clocked by XCLK through transistor 223 into a latch circuit consisting of inverter 221 feeding inverter 225 and the output of inverter 225 being clocked one cycle later back to the input of inverter 221 to refresh the latter through transistor 227 by NXCLK clock. NXCLK also clocks the signal through transistor 229 into a second latch consisting of inverters 231 and 233. The output of 233 refreshes the input of 231 on the next XCLK signal and at the same time transistor 231 transmits the output of inverter 233 through transistor 234 to the input of inverter 241. The output of inverter 231 also feeds on line 237 directly into a first input of NOR circuit 245. Since the signal from inverter 241 is that which occurred one cycle earlier relative to the signal on line 237 if there has been a signal transition in that cycle both inputs to NOR circuit 245 will be low and its output will be high. The output of NOR circuit 245 is clocked by XCLK 247 through inverter 249. It is again clocked through transistor 251 by NXCLK to driver-inverter 253 whose output XPTRCLR which is high appears on line 215. Thus, two cycles of NXCLK are required to transmit on XPTRCLR line 215 after clocking in by transistor 189 and so 2 cycles of clock delay occur.

Transistor 255 passes the set/reset latch 311 output on a BCLK clock signal into 3 successive latches consisting of inverters 257, 261, 265, 267, 273 and 275 and gate transistors 259, 263, 269, and 271. Transistors 277, 279 and 500 and inverter 281 perform the same function as transistors 235, 234 and 243 and inverter 241, respectively. The output of NOR circuit 285 on line 289 is clocked by NBCLK through transistor 291 to inverter 293 onto line 411 and clocked by BCLK through transistor 295 and inverter 297 onto line 409. The output of inverter 297 also is clocked by NBCLK through transistor 299 into inverter 401 and out of the latter onto BPTRCLR line 217. The latter output is also fed back through transistor 403 on BCLK through driver 405 and on NBCLK through transistor 407 to NOR circuit 194 to reset the set/reset latch 311.

The output BCOVR on line 411 is coupled to one input of NOR circuit 413. The output of the latter is gated by BCLK through transistor 415 to inverter/driver buffer 417 to give an active low NEBOUF output on line 419 which indicates an elastic buffer error. The inverse of BCOVR, namely BCOVR or (NBCOVR), on line 409 is fed into one input of NOR circuit 421. The output of the latter is gated by NBCLK through transistor 256 into inverter 258. The output of inverter 258, in turn, goes both to inverter 260 and through transistor 262 as gated by BCLK to inverter/driver buffer 264 and is outputted as DBNCLR on line 276.

The DDHALT output of inverter 435 goes to NOR circuit 413 as its second input, to inverter 439 through transistor 431 gated by BCLK, to one input of NOR circuit 427 through transistor 427 gated by BCLK and through transistor 429 gated by BCLK back to the input of inverter 433 to refresh the signal level at that point. The output of NOR circuit 423 goes to a second input of NOR circuit 421. The second input of NOR circuit 423 is gated through transistor 425 from a DDTOUT signal obtained from another circuit and used to clear the input buffer in a controlled way. Various long term phase errors can accumulate due to such things as crystal changes with temperature. In order to clear the buffer without interfering with normal operation a signal DDTOUT is provided just after a token has passed.

BCOVR line 409 is gated by NBCLK through transistor 447 into NOR circuit 428 and the output of inverter 439 is gated by the same clock signal into a second input of circuit 428. The output of the latter passes through inverter 430, through transistor 432 and is fed into gated clock 434 (similar to gated clock 180) whose output SELDIS on line 436 follows BCLK whenever its input is high and gets pulled down by NBCLK on line 438.

The output of inverter 439 passes through transistor 440 into another gated clock 442 which follows NBCLK on line 438 and gets pulled down by BCLK on line 444. The output of device 442 is is DDSHIFT on line 446. DDSHIFT is the clock which shifts the input pointer 111.

In the normal case when ERDET is high, the signal level on line 193 will be low and that on line 283 will be high. Regardless of the signal on line 287 the signal on line 289 will be low, that on line 411 high and that on line 409 low. The output BPTRCLR on line 217 after passing through transistor 299 gated by NBCLK and passing through buffer/driver 401 will be low.

A high level on line 411 results in a low output from NOR circuit 413 and a high NEBOUF output on line 419 after passing through driver/inverter 417.

When DDTOUT goes high it results in a low output from NOR circuit 423 regardless of the signal level present on DDHALT line 448. With both inputs of NOR circuit 421 low its output goes high causing DDHALT line 448 to go high and DBNCLR line 445 to go high.

When ERDET goes low marking an error condition then the output on line 411 goes low, that on line 409 goes high forcing the output of NOR circuit 421 to go low and DDHALT to go low. With both inputs of NOR circuit 413 low its output goes high and NEBOUF on line 419 goes low.

Normally line 409 is low and the input through transistor 447 is low. At the same time DDHALT is normally low in the absence of both an ERDET signal and a DDTOUT signal. This results in the signal passed through transistor 425 to be high, the output of NOR circuit 428 to be low and the output of inverter 430 to be high allowing BCLK to be generated as SELDIS on line 436. When ERDET goes low, BCOVR line 409 goes high driving NOR circuit 428 to have a zero output and to leave SELDIS running at BCLK. With ERDET high (its normal condition) line 409 is low and to get DDHALT high requires DDTOUT to go high as explained above. This results in both inputs to NOR circuit 428 to go low and its output to go high turning off SELDIS on line 436. At the same time the input to device 442 is low making DDSHIFT stop. Normally DDSHIFT on line 446 runs at NBCLK and is stopped by a DDTOUT signal.

Figure 15:
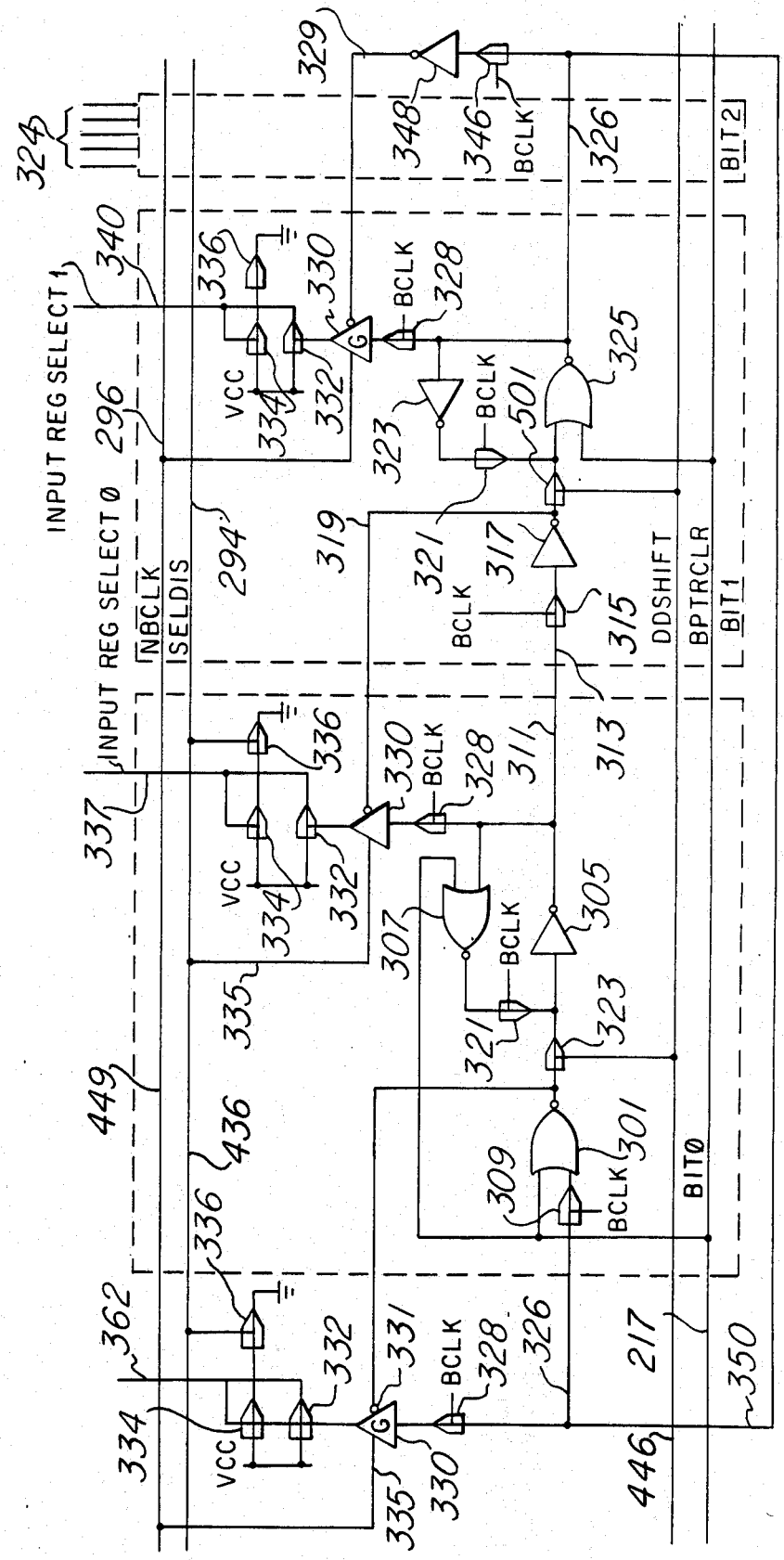
FIG. 15 is a circuit diagram of the input pointer register of the FIFO buffer.
Figure 16:
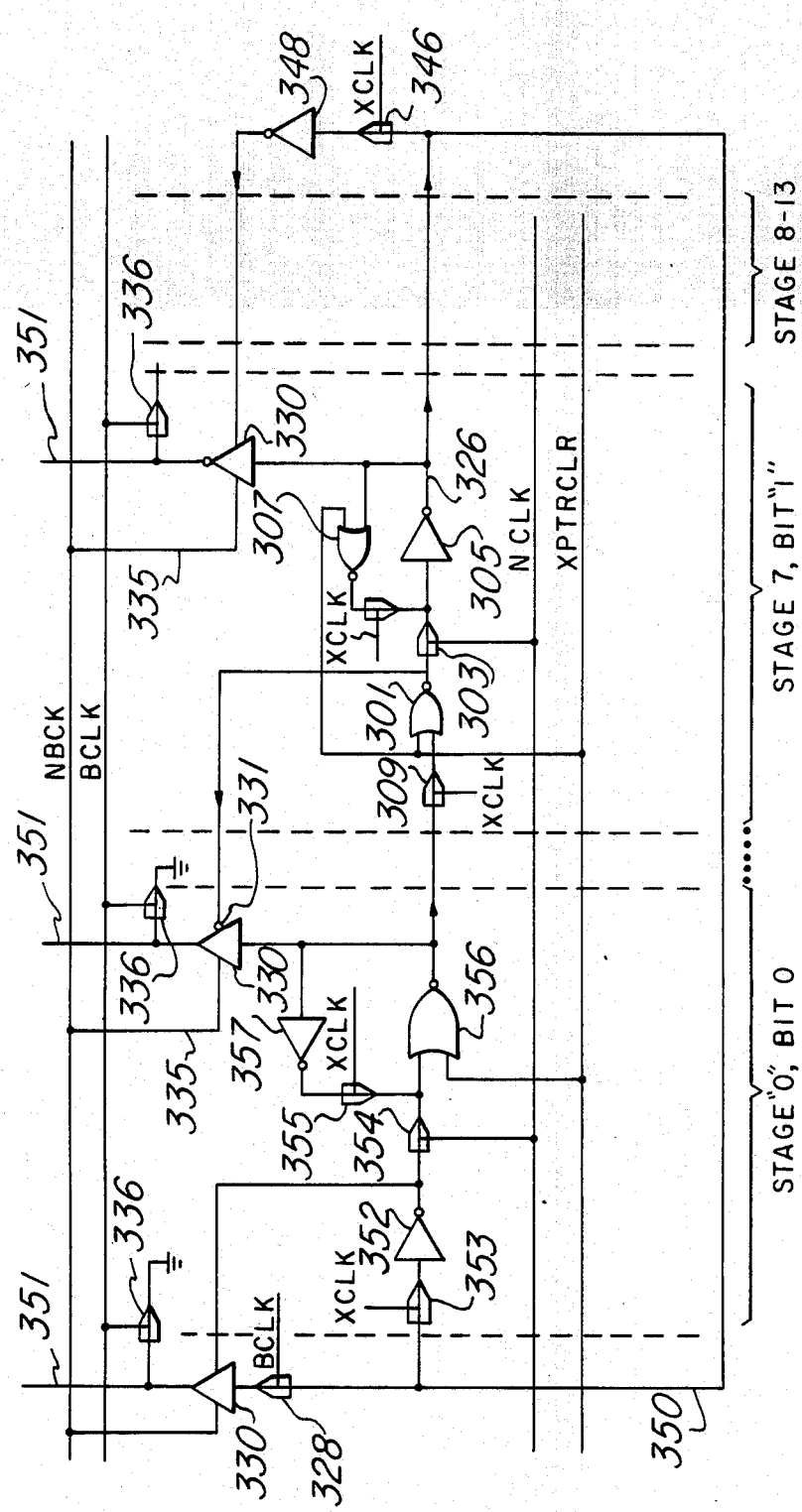
FIG. 16 is a circuit diagram of the output pointer register of the FIFO buffer.

The function of the signals BPTRCLR signal on line 217 is to reset the input pointer circuit 111 on the next BCLK clock signal. The function of the DDSHIFT clock signal on line 446 is to shift bits in the input pointer stages from one stage to the next while the SELDIS clock signal on line 436 grounds the INPUT REG SELECT lines 337, 340, 342 and 362 seen in FIG. 15 on each positive half cycle. The logic circuitry of FIG. 15 operates such that upon a DDTOUT signal being generated the input pointer shifts the bits to the next stage then stops. Prior to shifting, these bits are put onto corresponding INPUT REG SELECT lines of associated data register cells 10 and remain as fixed levels. The input pointer 12 then halts so that no further input data flows into the data register cells 10 while the output pointer 14 keeps shifting data out onto Data-Out line 88 until it reaches the cell before the one corresponding to the input pointer stage in which a "1" bit was last stored. This ensures that all data in the cells 10 is extracted in a time which is only long enough to complete extraction before the FIFO is cleared. The input pointer 12 is identical to the output pointer circuit 14 shown in FIG. 7, except for positioning of a bit which resets as "1" rather than "0" and the use of XCLK, NXCLK and XPTRCLR instead of BCLK, NBCLK, BPTRCLR, respectively, and the replacement of SELDIS and DDSHIFT by BCLK and NBCLK, respectively. In the first bit position called bit 0, a transistor 309 couples line 326 to one input of a NOR circuit 301. The other input of the latter is coupled to BPTRCLR line 154 and to an input of NOR circuit 307. The output of NOR circuit 301 is gated by DDSHIFT through transistor 303 to an input of inverter 305. The latter output also goes to the pull down input of gated clock 330 of a previous stage or in the case of bit 0 to the device of bit 13. The output of inverter 305 goes to another input of NOR circuit 307 and also along line 311 to line 310 of the bit 1 stage which is the next adjacent stage. Also coupled to the output of the inverter 305 is a transistor 328 clocked by BCLK which in turn connects to an input of a gated clock 330. The latter has a pull-up input 335 connected to NBCLK line 296 and a pull-down input 331 connected to line 316 of the of the next stage which in this case is bit 1. The output of gated clock 330 gates a transistor 332 coupled between Vcc and INPUT REG SELECT line 337. Transistor 336 is coupled between the latter line and ground and is gated on by SELDIS line 294. Transistor 334 coupled from Vcc to line 337 operates in the depletion mode with its gate connected to line 337 and provides a small current to line 337 when transistor 332 is off. An extra gated clock 330 and transistors 332, 334 and 336 is provided adjacent the first stage in order to provide an IN REG SELECT line 362 corresponding to linen 170 shown in FIG. 12.

In operation whenever a reset pulse appears on BPTRCLR line 217 it drives the output of NOR circuit 307 to ground and on BCLK the input of inverter 305 low as well. Thus the output of inverter 305 goes high. On BCLK transistor 328 passes this signal on to the input of gated clock 330 which will follow NBCLK on line 335 since the signal on pull-down input 331 is low. Thus, line 337 will be driven to Vcc on each positive cycle of NBCLK on line 449 and to ground otherwise by the turning on of transistor 336 by SELDIS signal on line 436. The BPTCLR signal on line 217 starts on NBCLK and transistor 303 is gated also on NBCLK so that the output of line 311 is reset immediately to 1. The next BCLK puts a zero on both inputs of NOR circuit 301 which results in a "1" output from that device. The next DDSHIFT pulse which occurs on NBCLK shifts this "1" level to the input of inverter 305 and drives its output to zero and at the same time pulls down gated clock 330 of the previous stage which in this case is bit 13.

Each of the other stages is identical to that shown for bit 2. In this case transistor 315 gated by BCLK couples to an input of inverter 317. The output of the latter is coupled by line 319 to a pull-down input 331 of a gated clock 330 of a previous stage. It is also coupled through transistor 501 gated by DDSHIFT to one input of NOR circuit 325. The other input of NOR circuit 325 is coupled to BPTRCLR. The output of NOR circuit 325 couples by line 326 to a transistor 315 of a subsequent stage and also to the input of an inverter 323 coupled through transistor 321 gated by BCLK to the one input of NOR circuit 325. Line 326 is also coupled through transistor 328 gated by BCLK to gated clock 330 connected in an identical arrangement as in the previous stage for bit 0.

On receiving a BPTCLR signal NOR circuit 325 drives line 326 low which is refreshed by inverter 323 and transistor 321 on the next half cycle. Thus the output on INPUT REG SELECT line 340 will be at or near ground by the cyclical grounding through transistor 336.

On the BCLK pulse after NBCLK and BPTRCLR has gone positive, transistor 315 of the next stage (i.e. bit 1) couples the high level to inverter 317 of that level. On the next NBCLK signal when DDSHIFT goes high a zero input is fed into an input of NOR circuit 325. Thus, the output of the latter goes high since BPTRCLR is now low. Each of the other stages is set to zero since the signal on line 315 will be low not high. The high level is passed thus in sequence from one stage to the next.

The function of SELDIS is to ground all of the INPUT REG SELECT lines 337, 340 and 342 once for a half cycle of every cycle. The function of DDSHIFT is to step the bits of each stage of the pointers 111 from one stage to the next. DDSHIFT stops when the latch at the input to transistor 431 contains a "1" and the latter occurs whenever BCOVR is low and DDTOUT is high. DDSHIFT shuts off first and on the next half cycle SELDIS shuts off. On the last positive cycle of DDSHIFT, there will be a shift of the bit in each stage to the next. On the same half cycle NBCLK puts the previous bit values on the coresponding INPUT REG SELECT lines. On the next half cycle transistors 309 and 315 fire pulling down all gated clocks 330 to ground.

The input pointer 111 will halt leaving the output pointer 127 running and reading out data in the data register cells 131 until it reaches the cell adjacent the one in which a "1" was last stored in the input pointer before the final shift. An error signal on ERDET line 167 will occur and, subsequently, change BCOVR from "0" to "1" restarting SELDIS first and then a half cycle later DDSHIFT. SELDIS grounds all outputs setting them to "0". The signals XPTRCLR and BPTRCLR reset the latches of the output and input pointers 111 and 127, respectively, and then DDSHIFT begins shifting data again.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A token ring access control protocol circuit having a token/frame transmission path and a processor, said token/frame transmission path comprising:
   a M/T converter for converting input serial data stream to a selected encoding;
   an BCLK baud clock signal source derived from an incoming data stream;
   means for temporarily serially storing incoming data and detecting incoming tokens/frames, coupled to said BCLK source for clocking the data into and out of said storing means;
   data sampling means coupled to said storing means for sampling data bauds and code violation bauds from data bauds of tokens/frames stored therein and for transmitting said data and code violation bauds to said processor;
   data modification means coupled to said storing means for reading data bauds out of and writing data bauds into a token/frame, bauds of which are stored in said storing means;
   data multiplexing means coupled to said storing means for reading data bauds out of and writing data bauds into a token/frame, bauds of which are stored in said storing means;
   data multiplexing means coupled to said storing means for transmitting one of a plurality of inputs therefrom in accordance with control signals from said processor;
   fairness means coupled to said path for examining passing tokens and to modify them in accordance with a fairness algorithm in response to release of a token and to control signals from said processor;
   wherein said data sampling and modification means are coupled to circuitry for
   (i) monitoring passing tokens/frames, recording their status, marking them and deleting them;
   (ii) examining the addresses of incoming tokens/frames and copying those with appropriate addresses, signaling the return of transmitted frames to said processor; and
   (iii) examining incoming tokens and determining those which can be used to transmit tokens/frames and, in response to control signals from said processor, to transmit tokens.

2. A token ring protocol circuit according to claim 1, wherein said data storing means includes a shift register coupled to the output of said M/T converter for holding a serial block of data of a predetermined number of bauds and a decoder coupled to said shift register for continuously comparing data bauds therein to a preset sequence of reference values and, upon detection of a predetermined starting delimiter sequence of bauds, generating a starting delimiter pulse for use in synchronizing subsequent circuitry and upon detecting a predetermined ending delimiter sequence of bauds generating an ending delimiter pulse for input to said processor.

3. A token ring protocol circuit according to claim 2, wherein said data modification means includes a data insertion multiplexer coupled to said shift register for receiving serial data signals therein, a transmit data input coupled to said processor and a plurality of data modification input coupled to said processor for inserting modified data into said serial data path.

4. A token ring protocol circuit according to claim 3, including an elastic buffer coupled to an output of said fairness means for absorbing phase jitter and drift in the incoming data stream and clocking the data out by a fixed baud clock XCLK.

5. A token ring protocol circuit according to claim 4, including a transmit output multiplexer having inputs coupled to an output of said data insertion multiplexer, an output of said fairness means and an output of said elastic buffer and responsive to a control sigal from said processor to transmit to its output a selected one of its inputs.

6. A token ring protocol circuit according to claim 4, including a monitor delay coupled to said transmission path for inserting a predetermined delay in said serial data path in response to a monitor control signal.

7. A token ring protocol circuit according to claim 6, wherein said monitor delay includes a first monitor delay coupled to an output of said fairness circuit and a second monitor delay coupled to an output of said elastic buffer, said first monitor delay being sufficiently long to allow deletion of starting delimiters from defective tokens and a second monitor delay coupled to an output of said elastic buffer of sufficient delay to allow said elastic buffer to be cleared before a frame being transmitted thereby returns.

8. A token ring protocol circuit according to claim 7, wherein said incoming data stream is in Manchester encoded form and said M/T converter converts incoming data to transitional encoded form.

9. A token ring access control protocol circuit having a token/frame transmission path and a processor for controlling data flow in said path and for handling data and transmitting data along said path, said token/frame transmission path comprising:
   a M/T converter for converting a Manchester encoded input serial data stream to transitional encoding;
   a shift register coupled to an output of said M/T converter for holding a serial block of data of a predetermined number of bauds;
   a decoder coupled to said shift register for continuously comparing data bauds in said shift register to a preset sequence of reference values and, upon detection of a predetermined starting delimiter sequence of bauds, generating a starting delimiter pulse for use in synchronizing subsequent circuitry and upon detecting a predetermined ending delimiter sequence of bauds generating an ending delimiter pulse;

a data sample latch circuit having an input coupled to said shift register and decoder for sampling data at least two bauds downstream of said shift register input and having one output for data values and another for corresponding code violation values, said outputs coupled to said processor;

a data insertion multiplexer having a repeat data input coupled to said shift register for receiving serial data signals thereon, a transmit data input coupled to a data transmitting circuit and a plurality of data modification inputs coupled to respective state machines in said processor for inserting a modified data into the serial data path;

a fairness circuit having an input coupled to an output of said data insertion multiplexer and responsive to a fairness control signal to delay the incoming data stream and to examine and modify passing tokens in accordance with a preselected fairness algorithm;

a monitor delay coupled to said transmission path for inserting a predetermined delay in said serial data path in response to a monitor control signal;

an elastic buffer coupled to an output of said monitor delay having a plurality of serial data baud register cells and control means for adjusting the number of such cells between a cell into which a data baud is being stored and a cell out of which a data baud is being directed so as to absorb phase jitter or drift in said incoming serial data signal;

a transmit output multiplexer coupled to an output of said token/frame transmission path; and a T/M converter coupled to an output of said transmit output multiplexer for converting transitional encoded data to Manchester encoded data.

10. A token access control protocol circuit according to claim 9, wherein said monitor delay includes a first monitor delay coupled to an output of said fairness circuit for delaying tokens/frames sufficiently long to permit said processor to remove a starting delimiter from a defective token/frame and a second monitor delay coupled to an output of said elastic buffer for delaying tokens/frames sufficiently long to permit said buffer to clear before the token/frame can return to said elastic buffer.

11. A token ring access control protocol circuit according to claim 10, wherein said first monitor delay is 7.5 bauds and said second monitor is 24.5 bauds.

12. A token ring protocol circuit according to claim 9, wherein said data sample latch circuit is coupled to a second baud of said shift register.

13. A token ring protocol circuit according to claim 9, wherein said processor is clocked by a bit clock derived from a baud rate clock supply BCLK.

* * * * *